May 11, 1965     C. H. WHITMORE ETAL     3,182,538
MACHINE FOR CUTTING LENGTHS OF STOCK INTO PIECES
Filed Aug. 31, 1961                                 20 Sheets-Sheet 1
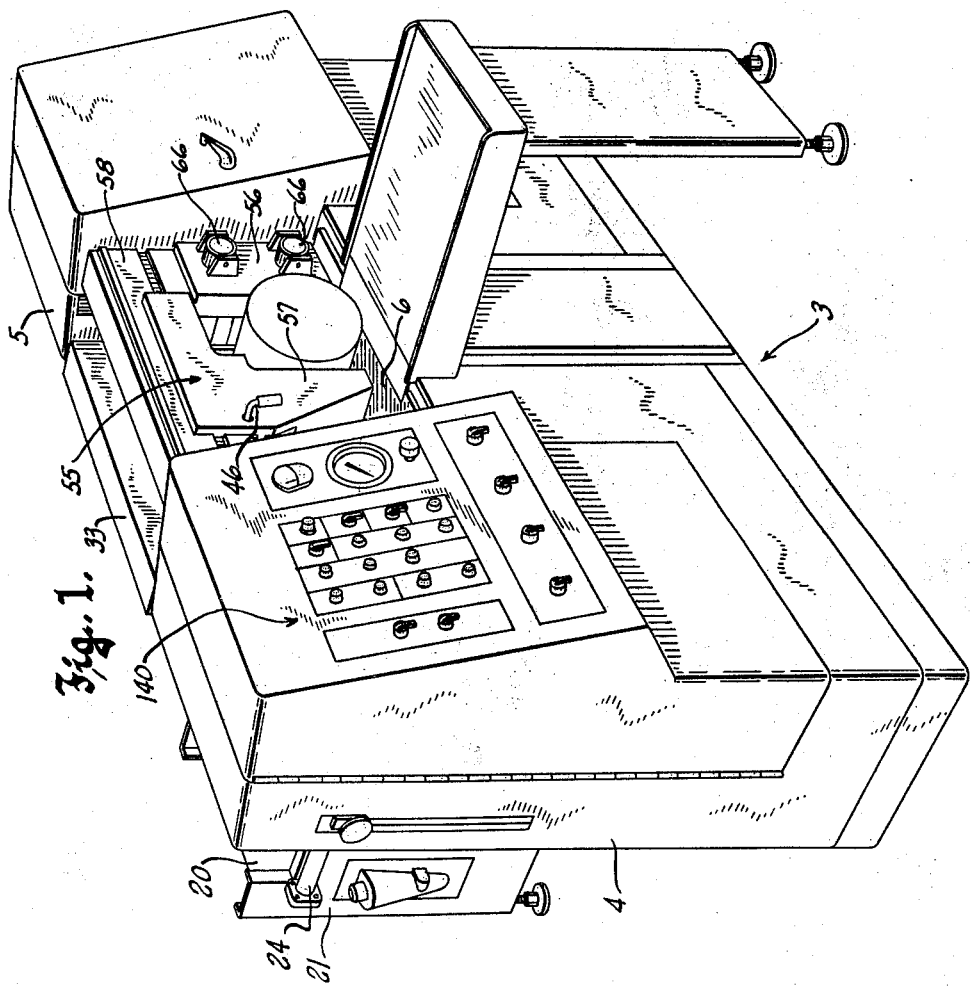
Inventors
Charles H. Whitmore
Thomas C. Sebastian
Russell G. Winquist

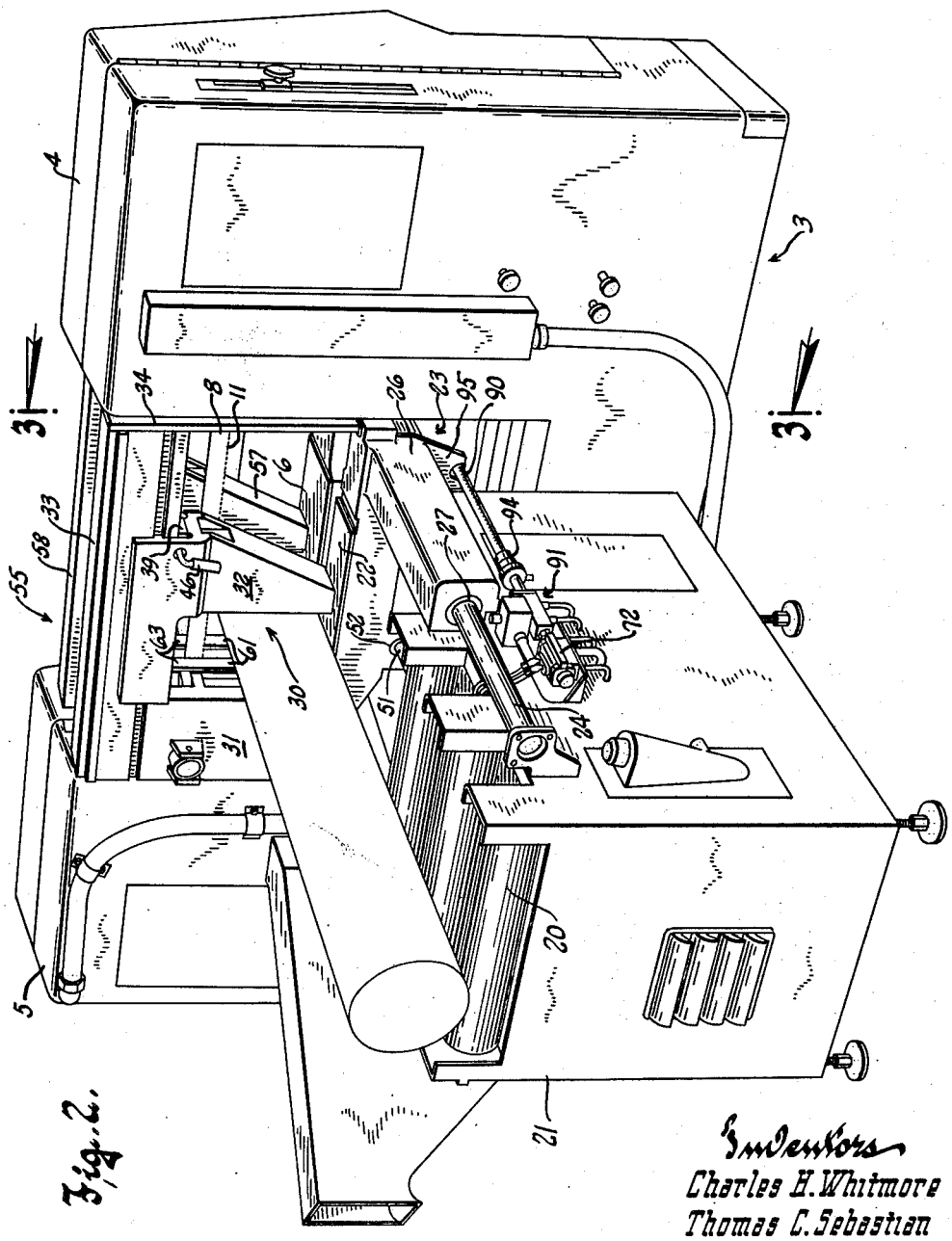

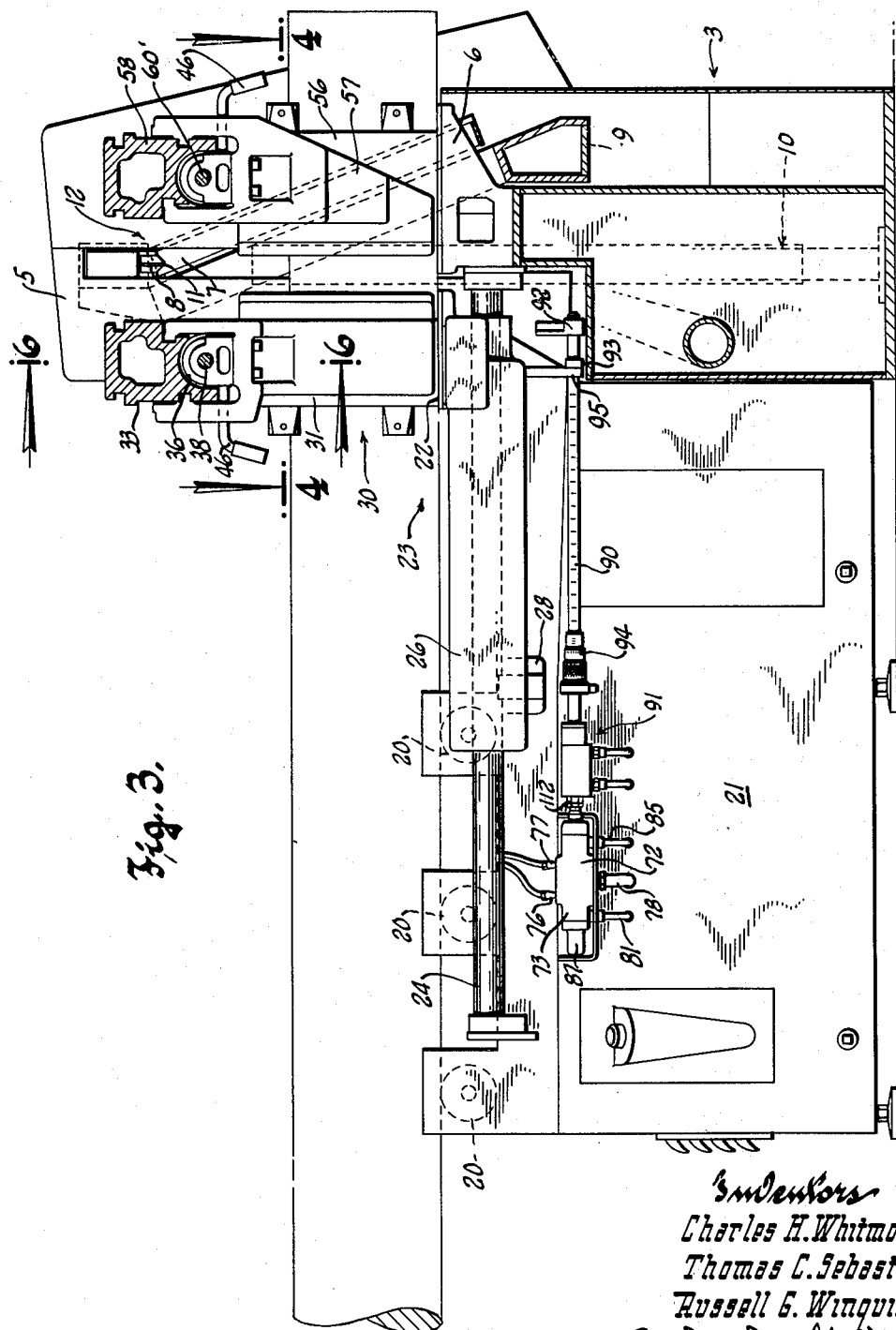

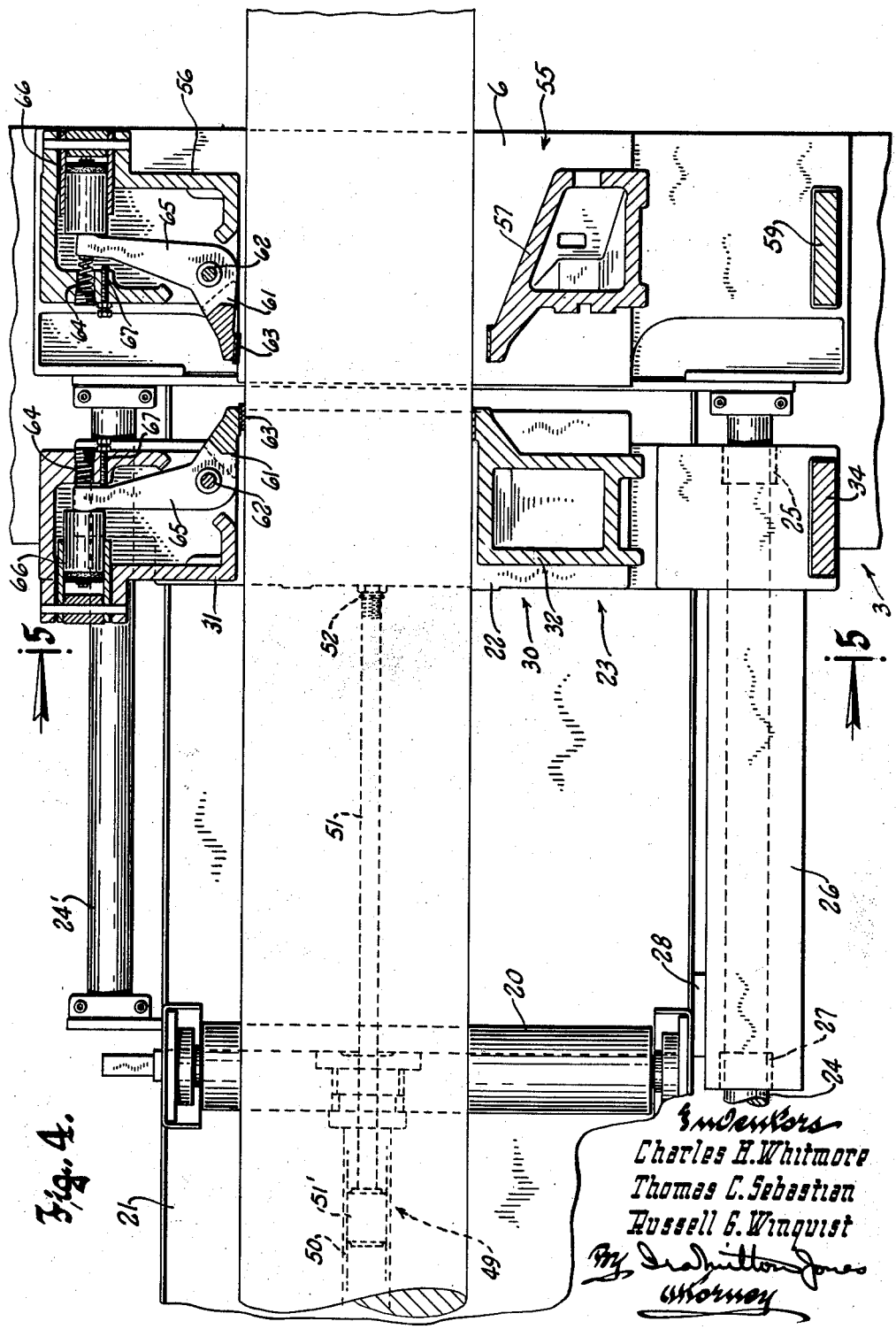

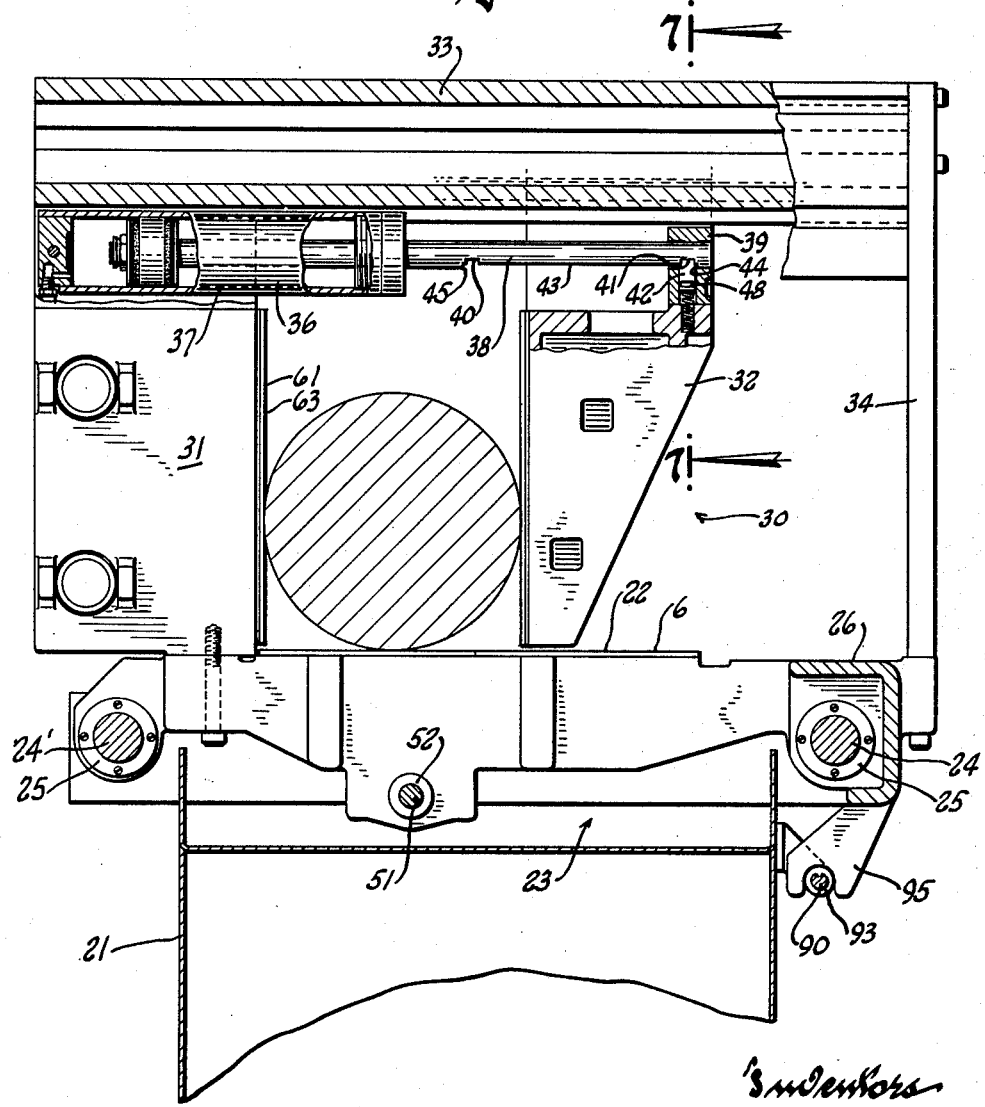

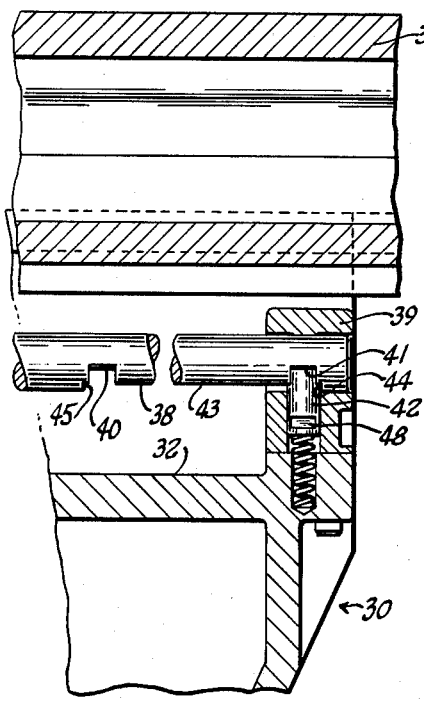
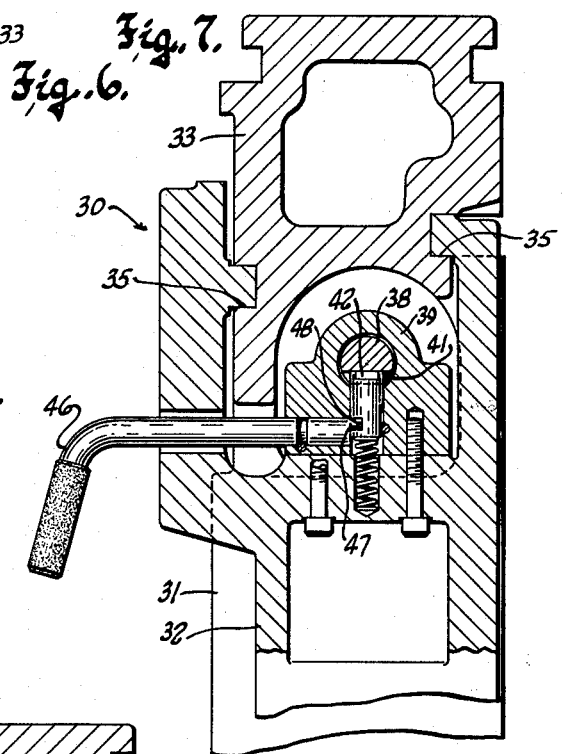
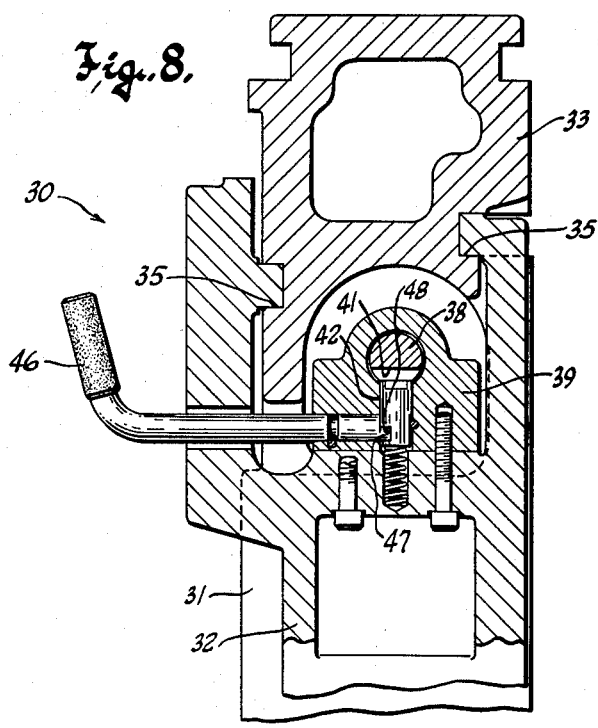

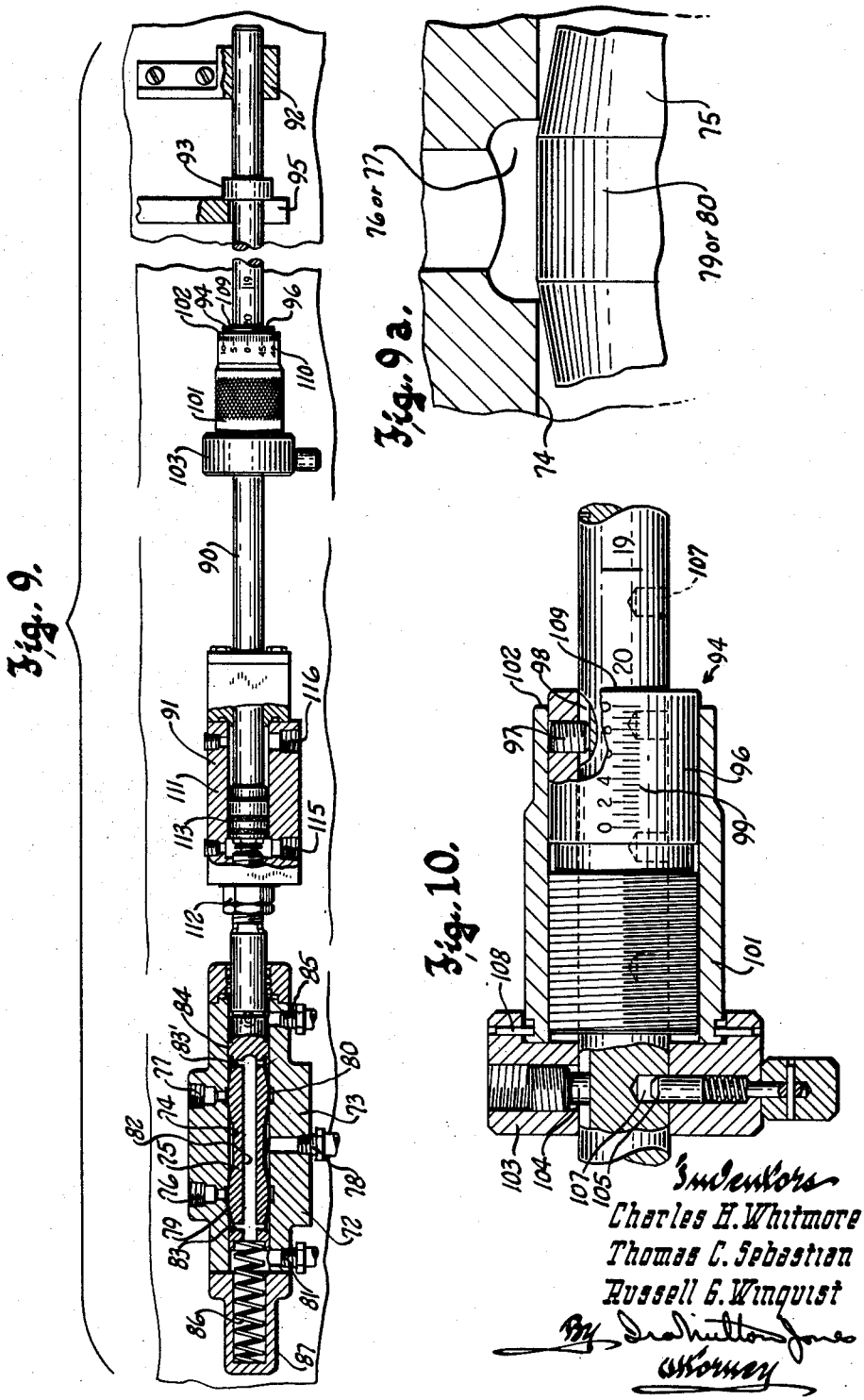

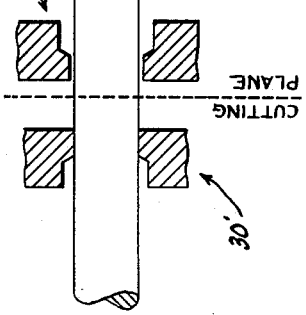
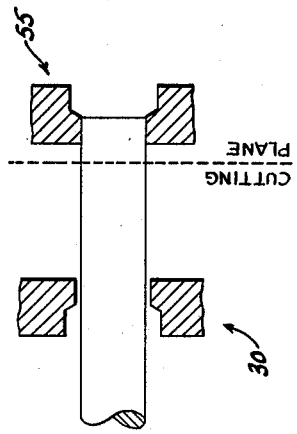
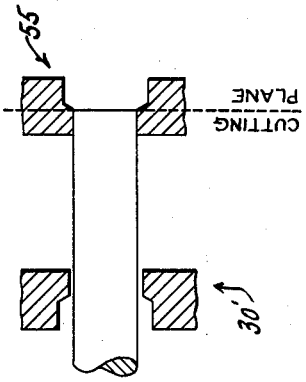
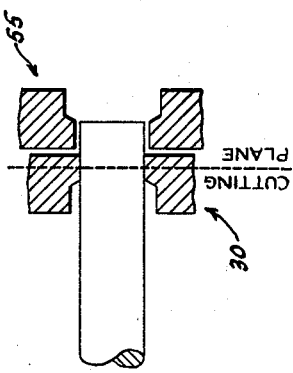
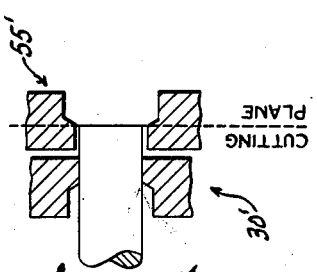
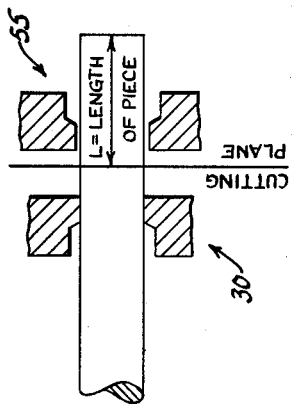

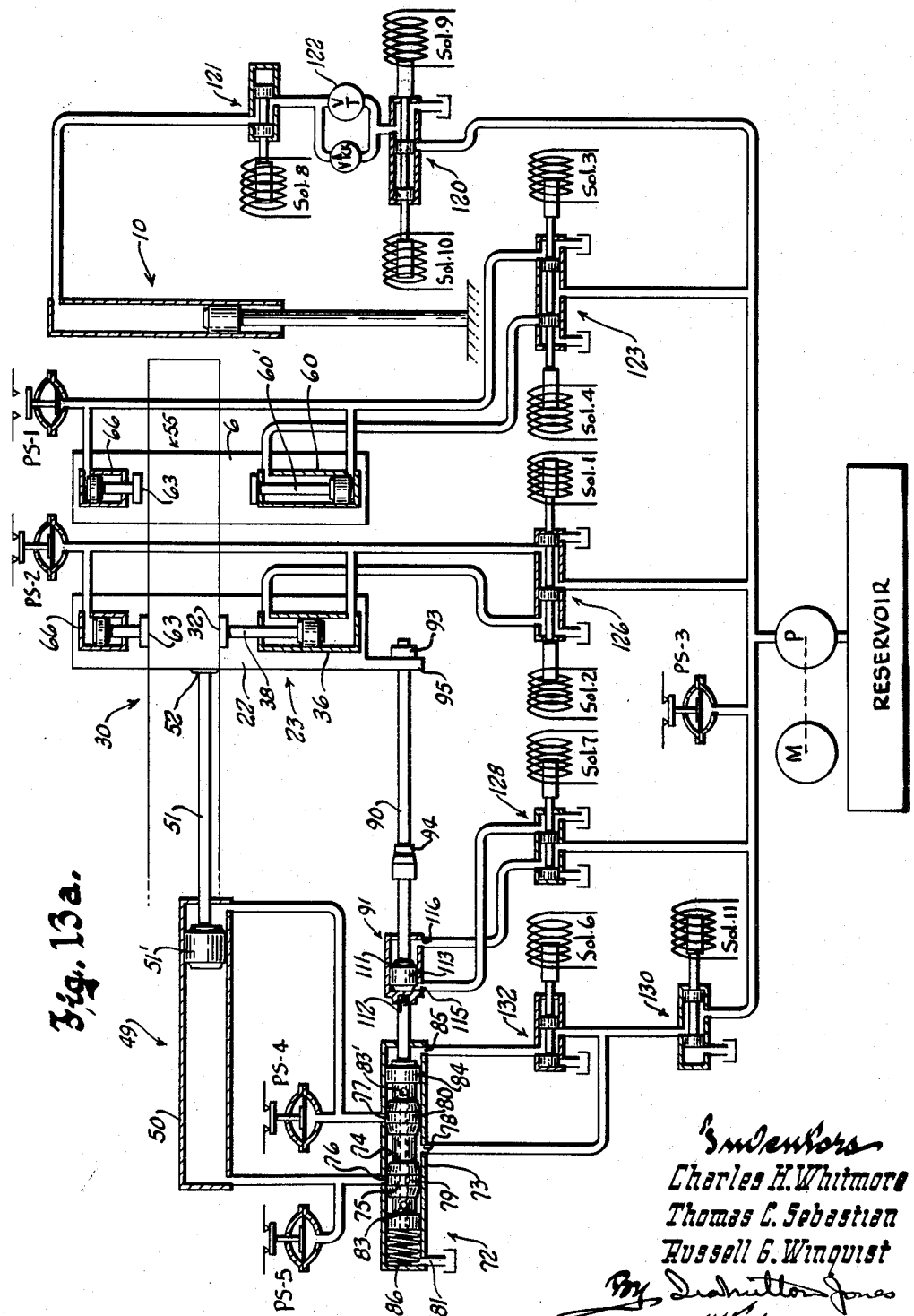

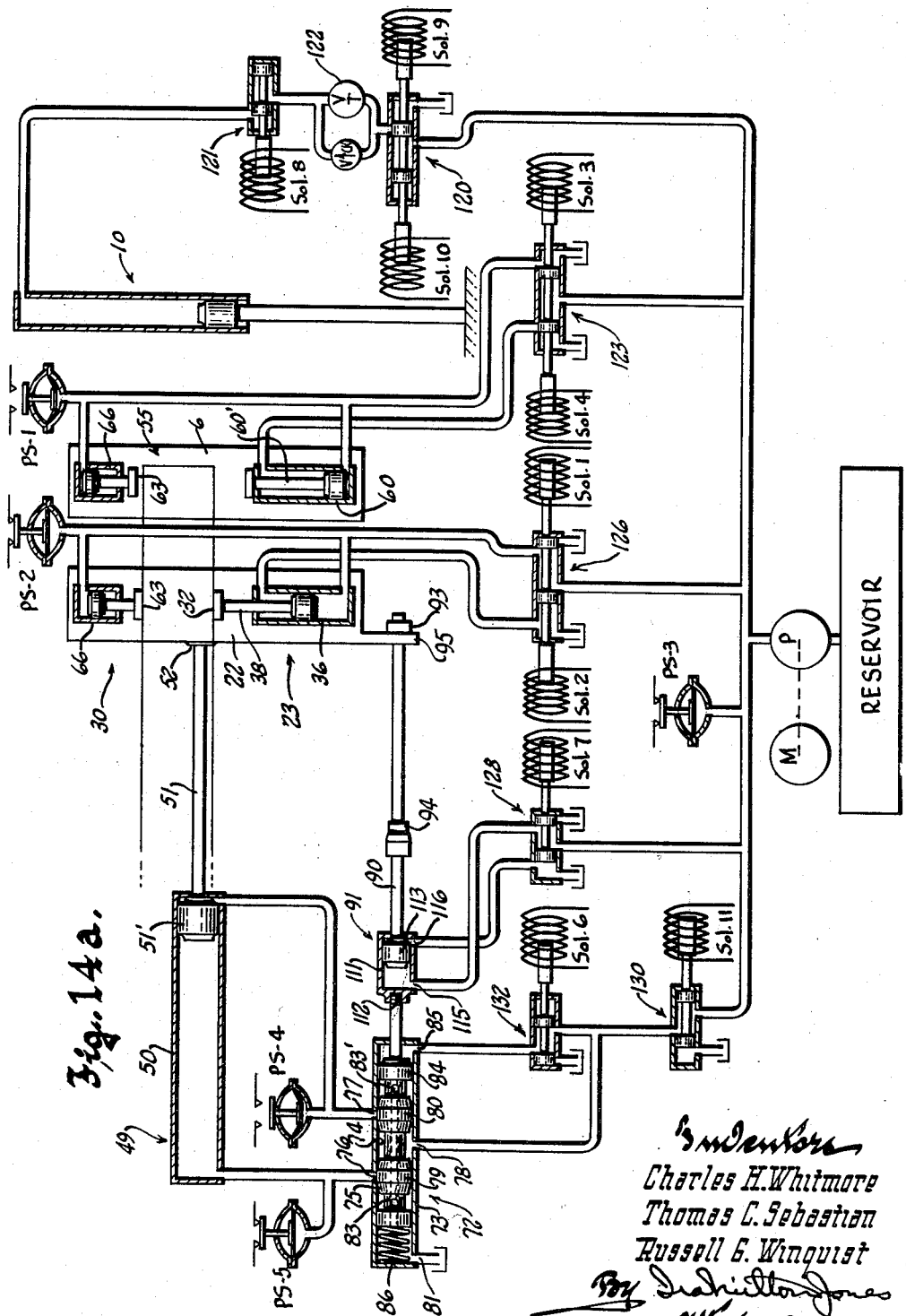

May 11, 1965

C. H. WHITMORE ETAL 3,182,538

MACHINE FOR CUTTING LENGTHS OF STOCK INTO PIECES

Filed Aug. 31, 1961

Inventors
Charles H. Whitmore
Thomas C. Sebastian
Russell G. Winquist
By
Attorney

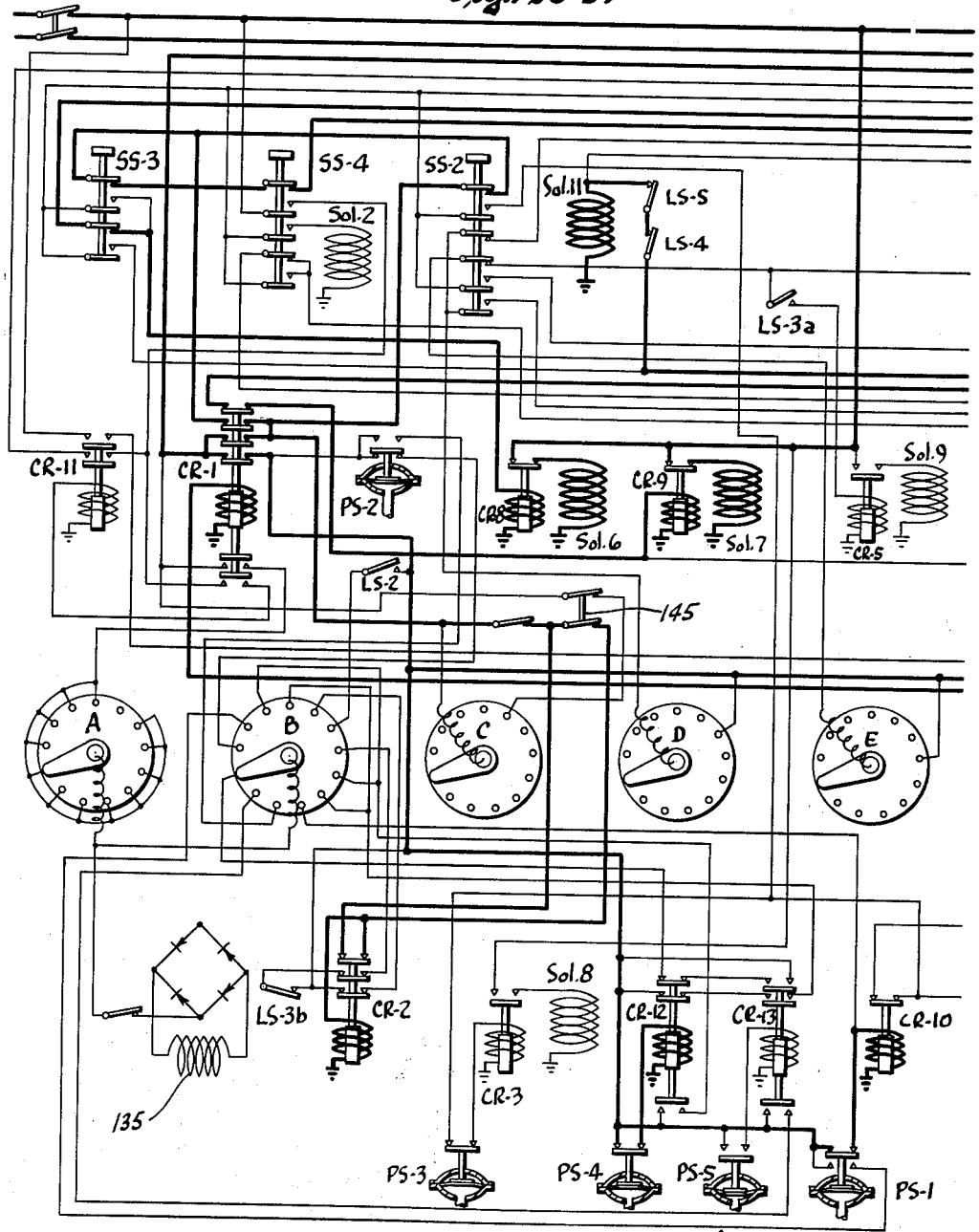

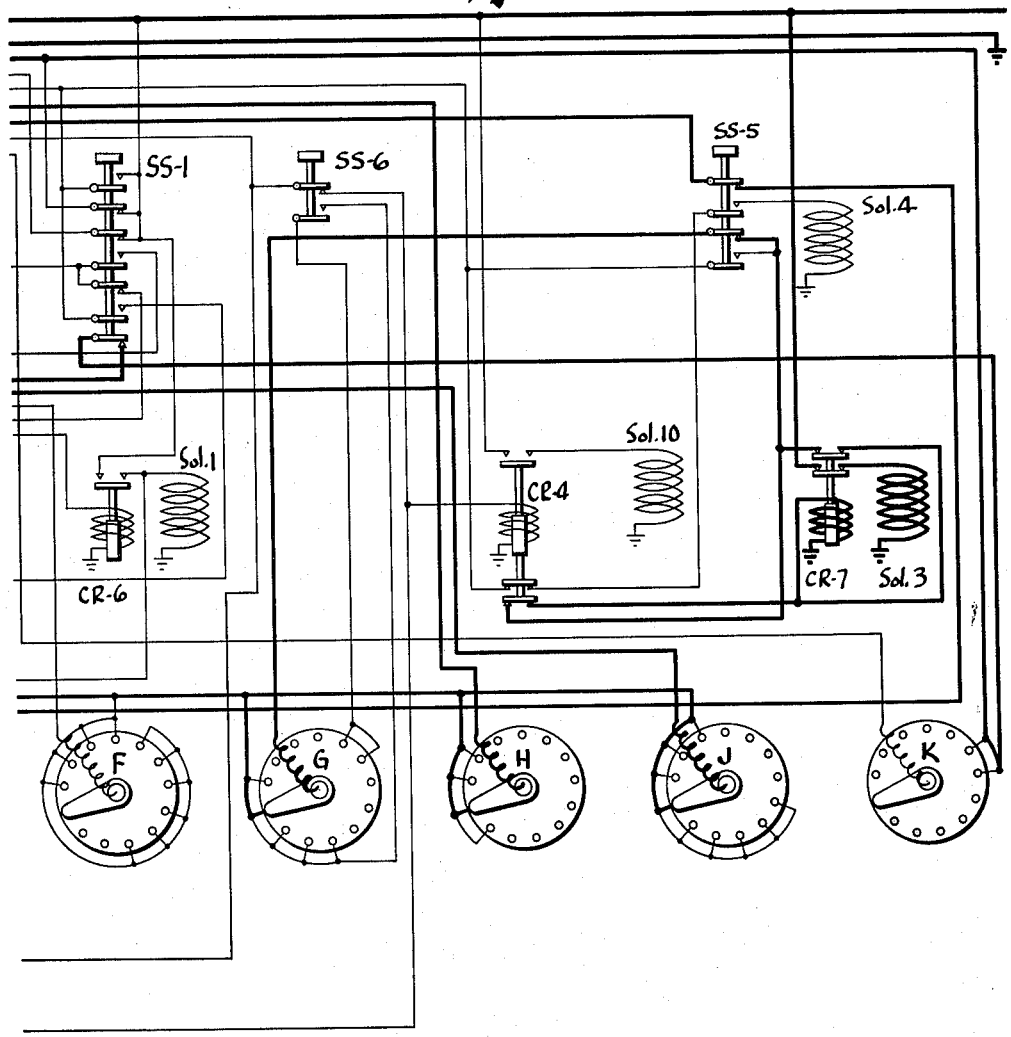

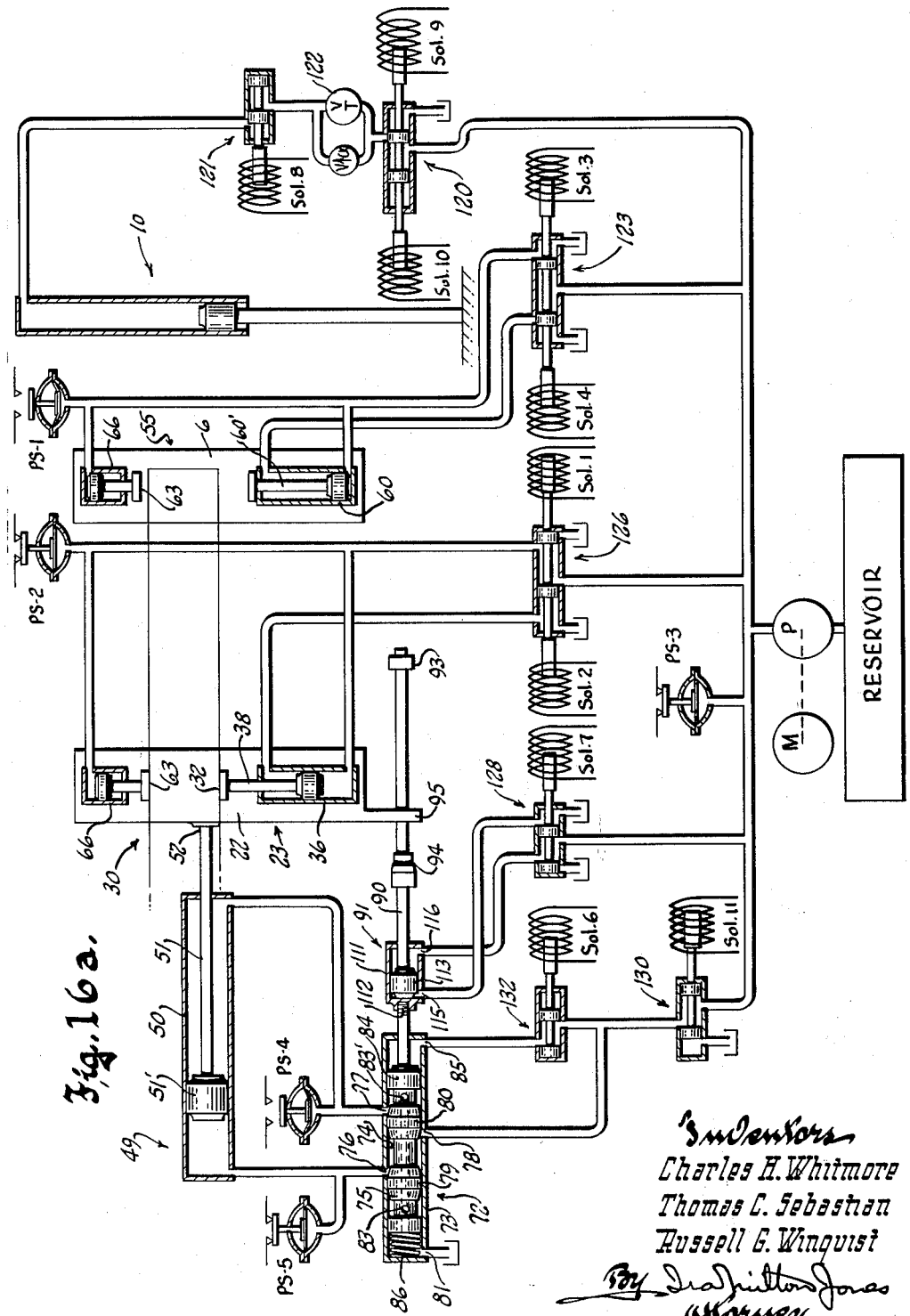

3,182,538
MACHINE FOR CUTTING LENGTHS OF
STOCK INTO PIECES
Charles H. Whitmore, Savage, Thomas C. Sebastian, Shakopee, and Russell G. Winquist, St. Paul, Minn., assignors to Continental Machines, Inc., Savage, Minn., a corporation of Minnesota
Filed Aug. 31, 1961, Ser. No. 135,184
17 Claims. (Cl. 83—201)

This invention relates to machine tools generally classed as cutoff saws, though certain of its features are no doubt also applicable to other types of machines.

Structurally the machine of this invention follows the general design and pattern of the cutoff saw forming the subject matter of the Crane et al. Patent No. 2,898,669, and as to certain of its features it is somewhat similar to the cutoff saw of the Crane Patent No. 2,932,229. Thus, as in both of these patents the machine of this invention employs an endless saw band trained about horizontally spaced pulley wheels as the cutting tool, and, as in the Crane et al. patent, it is the top stretch of the band which does the cutting.

The wheels or pulleys about which the saw band is trained, are carried by a saw head or frame which is mounted on the base of the machine for vertical translation, and the top stretch of the band which does the cutting is twisted and constrained to travel in a fixed vertical cutting plane. The stock to be cut is supported and held in place beneath the top stretch of the band.

Since the machine of this invention is intended to handle relatively large and heavy pieces of stock, some power means for advancing or feeding the same into position to be cut must be provided. In the machine of the Crane et al. patent this is done by supporting the stock on rollers and driving all of these rollers in unison when it is necessary to advance the stock. Obviously this manner of feeding the stock does not lend itself readily to accurate indexing. In the Crane patent (2,932,229) a slidably mounted indexing vise grips the stock and advances it to a stationary vise which grips the work and holds it during the cutting operation and while the indexing vise is retracted preparatory to the next indexing stroke.

The use of a reciprocable indexing vise to feed the stock to a holding vise, is of course more conducive to accuracy than merely turning a group of stock supporting rollers, but nevertheless, it has a serious objection, especially when the machine is used as a production tool to automatically cut a length of bar stock into pieces of predetermined uniform length. Since the vise by which the work is held during the cutting must be located at that side of the cutting plane from which the stock is fed—and which is generally regarded the rear of the cutting plane—in order that the stock will be held not only while it is being cut but also while the indexing vise is being retracted and reclosed upon the stock, it follows that the minimum length of stock that can be presented to the saw is at least equal to the width of the jaws of the holding vise plus the length of stock needed for a secure grip by the indexing vise. This results in a relatively long uncut stub end, which in the case of more costly materials is quite serious.

The present invention overcomes this objection.

As in the Crane Patent No. 2,932,229, the indexing of the work or stock is effected in the machine of this invention by a vise mounted for reciprocation towards and from the cutting plane, but unlike the arrangement in that patent, the same vise which indexes or advances the work also holds it during the cutting operation. Hence the length of the stub end of the stock is materially reduced. Since there is no holding vise between the cutting plane and the indexing vise which also holds the work while it is being cut, the indexing vise thus can be brought into close proximity to the cutting plane, and as a result the remaining uncut end portion of the stock need be no longer than required for a secure grip plus whatever clearance space is required between the cutting plane and the vise.

Accurate indexing of the stock, of course, requires that the stock be held during the time that the indexing vise is retracted to take a new grip upon the stock. How this might be accomplished and still have the combined indexing and holding vise advanced into close juxtaposition to the cutting plane presented one of the most serious problems solved by this invention.

To accomplish this result necessitated an entirely new method of indexing the stock, and in fact an entirely new method of cutting lengths of bar stock into pieces of predetermined uniform length.

It may be said, therefore, that one of the main objects of this invention is to provide an improved machine for cutting lengths of bar stock into shorter pieces, as a result of which the final remaining uncut stub end of the stock is considerably shorter than was possible in the past.

The invention accomplishes this purpose by providing a second vise in front of the fixed cutting plane, effecting relative movement between the stock and this front vise, and then using the second vise to grip the short front end portion of the stock which protrudes from the indexing and holding vise after the cut. With the front end of the stock thus gripped, it is of course possible to release the grip which the indexing and holding vise had upon the stock, and then retract this indexing and holding vise.

Although the Crane et al. Patent No. 2,898,669 has a vise located in front of the fixed cutting plane, that vise was not, and in fact could not be used in the manner in which the front vise of this invention is employed. Its only purpose was to hold work fed to the saw from in front of the cutting plane.

Although the short front end portion of a length of stock which protrudes from the indexing and holding vise may be gripped from in front of the cutting plane by moving the front vise rearwardly across the cutting plane and then gripping the end of the stock thereby, it is more feasible to have the front vise mounted in a fixed position in front of the cutting zone, and to move the stock forwardly into the front vise after the cutting operation and before the indexing vise is retracted.

Accordingly, this invention has an another of its objects, the privision of means to automatically effect an additional advance of the indexing and holding vise after the cutting operation is completed and the saw has been raised.

From this it follows that it is another feature of this invention to provide an improved control for the indexing vise whereby this vise is first advanced to a predetermined work holding position properly presenting and holding the work for cutting; then, at the completion of the cutting operation, is additionally advanced to present the protruding front end portion of the remaining length of stock to the vise in front of the cutting plane; and next, after the indexing vise has released its grip upon the stock and its front end has been gripped by the front vise, is retracted a predetermined distance which is adjustable within the range of the machine, to accurately index the stock for the next cut.

It is also an object of this invention to provide an improved way of stopping the stroke of the indexing vise—both during advance and retraction—to the end that greater accuracy in the placement of the work is possible. Essentially this involves the elimination of all mechanical stops and the substitution of hydraulic stops. As a result of this substitution, the indexing vise movements are repeatable to within one thousandths of an inch of its intended distance.

Although the power for clamping the stock and indexing it is supplied hydraulically in the machine of this invention, the sequence of events is programmed electrically. This assures the precise movement and exact timing of the actuated parts which is so essential to an automatically operating production machine. It reduces lost time between movements to a minimum and prevents overlapping of clamping and indexing phases that could cause stock slippage and inaccuracies in the length of the pieces cut.

Another important departure from prior practice made by this invention concerns the manner in which the work gripping vises are mounted. In the past it has always been customary to mount the vise jaws on ways in the table top of the base on which the work is supported. This, of course, located these ways in the work area or zone, so that chips or coolant could accumulate thereon.

With a view toward overcoming the obvious disadvantage of this arrangement, the present invention has as another of its objects to mount the vise jaws from above the work zone. Having the vise jaws mounted in this way has the advantage of achieving desirable compactness and greater rigidity, but, in addition, it permits long-stroke cylinders to be used to open and close the vises. As a result, only two positions are needed to adapt the vises to the full range of work sizes, i.e., the movable vise need be connected to the ram of the hydraulic cylinder which opens and closes the vise, in only one or the other of two positions. This two position connection compares to the prior practice of connecting the movable vise with the ram of a short stroke cylinder in a relatively large number of different positions—as, for instance, in the Crane Patent No. 2,932,229.

Mounting the vise jaws at the top has still another significant advantage. Despite the fact that the jaws of the vise are quite massive and necessarily strong, some slight spring or yield therein is inevitable. This produces an outward divergence of the jaws as the vise is closed onto the work. With the vise jaws mounted at the bottom, as has been the practice in the past, this slight outward divergence of the jaws imparts an upward thrust upon the stock which is cumulative with repeated indexing and gripping of a single length of stock. Unless means are employed to resist the resultant upward displacement of the stock, as by a hold-down clamp such as that illustrated in the Crane et al. patent, the stock will not be solidly down on the table during the cutting operation and, as a result, the cut is not accurate.

With the top-mounted vise jaws of this invention, the inherent resiliency in the jaws produces a downward divergence which imparts downward thrust upon the work, and thus automatically holds the work or stock down upon the table.

One of the jaws of each vise is preferably stationary so that the work is clamped solidly against it when it is gripped in the vise. With an exceptionally heavy piece of stock, the frictional engagement between the stock and the stationary jaws, even after the movable jaws are retracted, was considerable in the past; and in the case of the indexing vise this frictional engagement between the stationary jaw and the work would add greatly to the load imposed upon the power means provided to retract the indexing vise unless the frictional engagement is diminished or eliminated.

By the same token, the need for sliding the work past the fixed jaw of the stationary front vise added to the load of the power means during the indexing stroke.

With a view toward overcoming this excessive drag and increased load upon the indexing motor, this invention has as another of its objects to provide an improved vise construction which features a hinged work-engaging pressure shoe, that is hydraulically held in its operative work-engaging position when the vise is closed, but swung free of the work when the vise is open.

Finally, and with a view toward improving the machine generally, this invention provides an improved three point mounting for the carriage which carries the indexing vise.

With the above and other objects in view which will appear as the description proceeds, this invention resides in the novel apparatus for the practice of the invention, substantially as hereinafter described and more particularly defined by the appended claims, it being understood that such changes in the precise embodiment of the herein-disclosed invention may be made as come within the scope of the claims.

The accomanying drawings illustrate one complete example of the physical embodiment of the invention, and one modification of a portion thereof, constructed according to the best mode so far devised for the practical application of the principles thereof, and in which:

FIGURE 1 is a perspective view of a cutoff saw embodying this invention, said view being taken from in front of the machine;

FIGURE 2 is a perspective view taken from the rear of the machine;

FIGURE 3 is a sectional view through FIGURE 2 on the plane of the line 3—3;

FIGURE 4 is a cross sectional view looking down on the work supporting table and taken on the plane of the line 4—4 in FIGURE 3;

FIGURE 5 is a cross sectional view on the plane of the line 5—5 in FIGURE 4;

FIGURE 6 is a fragmentary detail sectional view taken through FIGURE 3 on the plane of the line 6—6;

FIGURE 7 is a fragmentary detail sectional view taken through FIGURE 5 on the plane of the line 7—7;

FIGURE 8 is a view similar to FIGURE 7 but showing the illustrated parts thereof in another position;

FIGURE 9 is a detail view partly in elevation and partly in section illustrating part of the indexing control mechanism for the indexing vise;

FIGURE 9A is a fragmentary detail view partly in section and partly in elevation illustrating particularly the valve means which controls the movement of the indexing vise.

FIGURE 10 is a fragmentary detail view partly in section and partly in elevation illustrating particularly the micrometer adjustment of the stop means which controls the length of the retraction stroke of the indexing vise;

FIGURES 11A, 11B and 11C are diagrammatic illustrations showing (1) the manner in which the stock is gripped during the cutting operation, (2) advanced after the cutting operation and (3) held in its advanced position while the rear indexing vise is retracted, all as employed in the preferred embodiment of the invention.

Figure 13B:
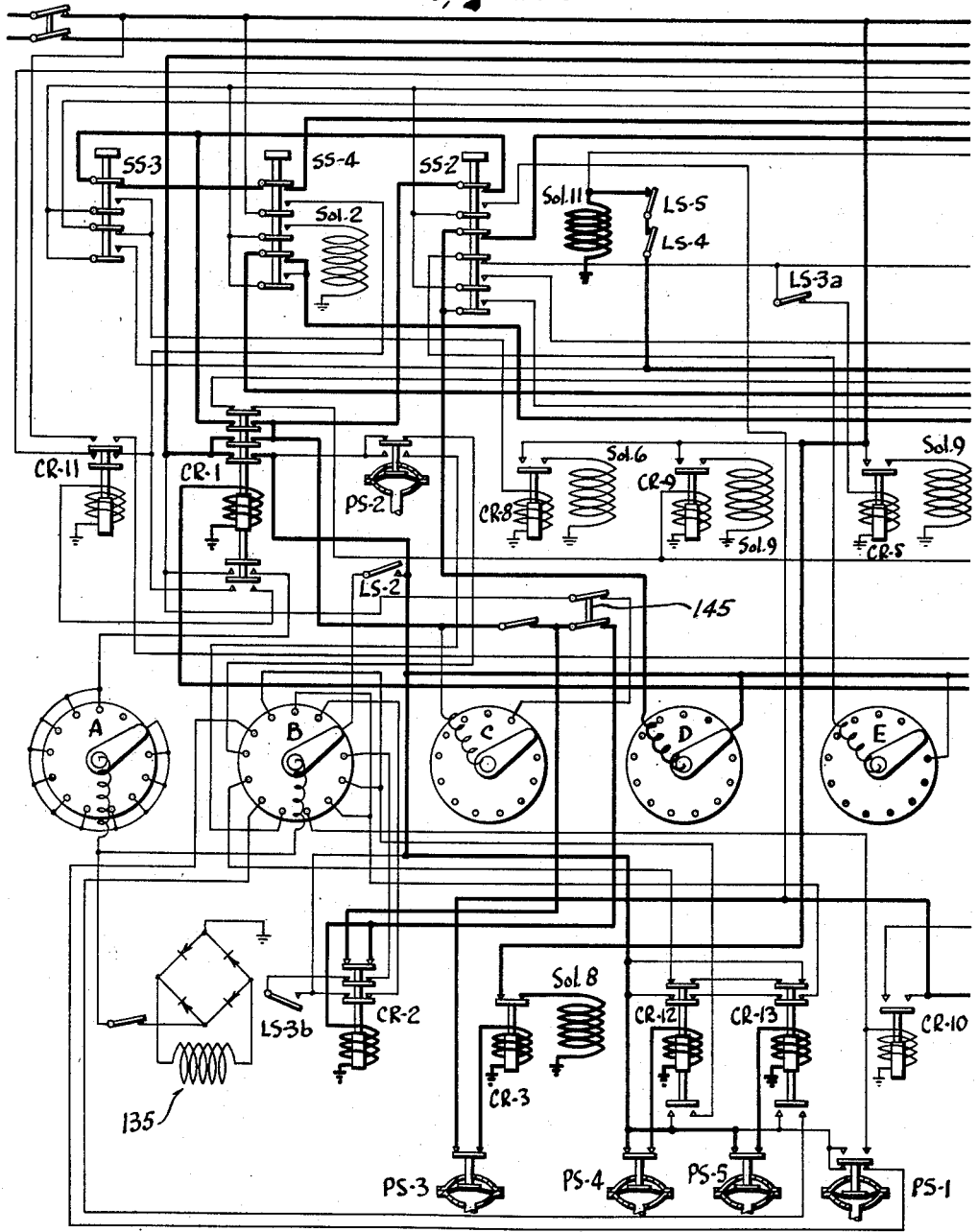
Figure 13C:
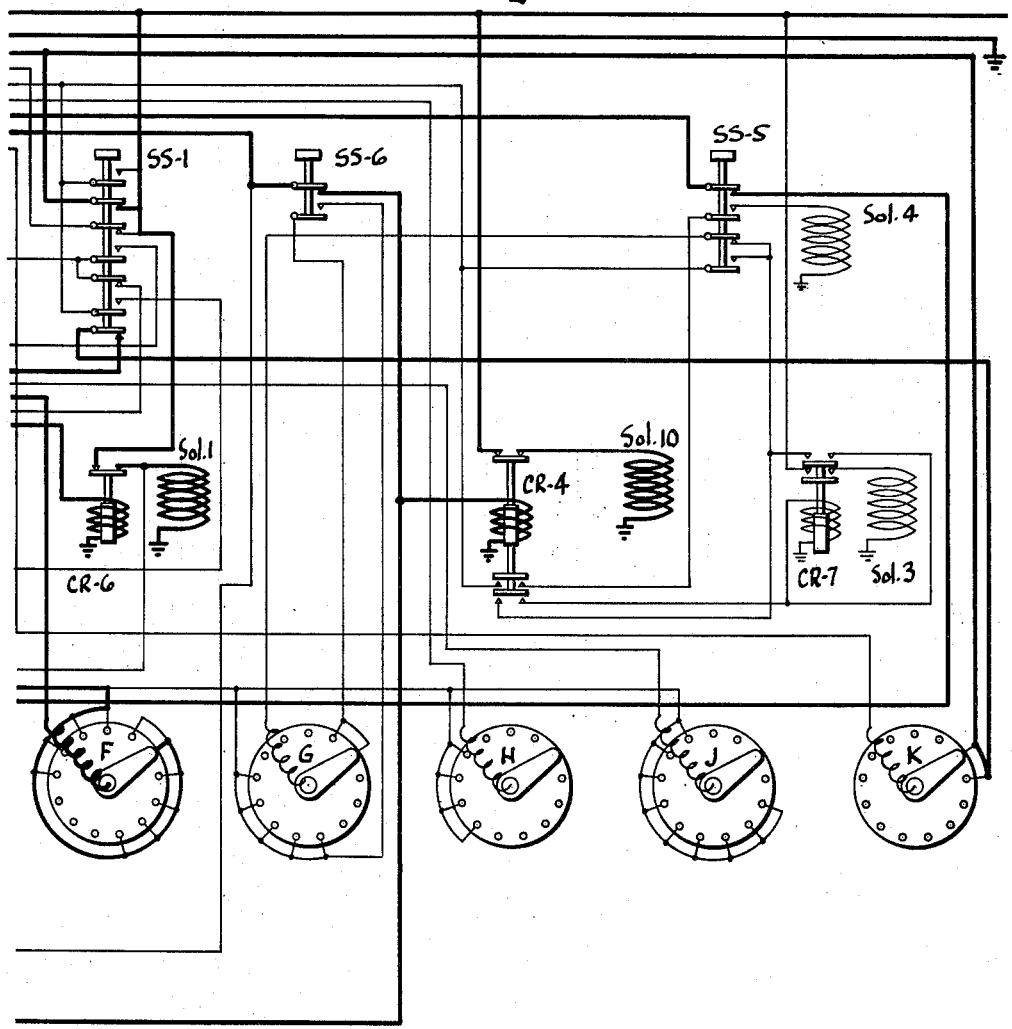
Figure 14B:
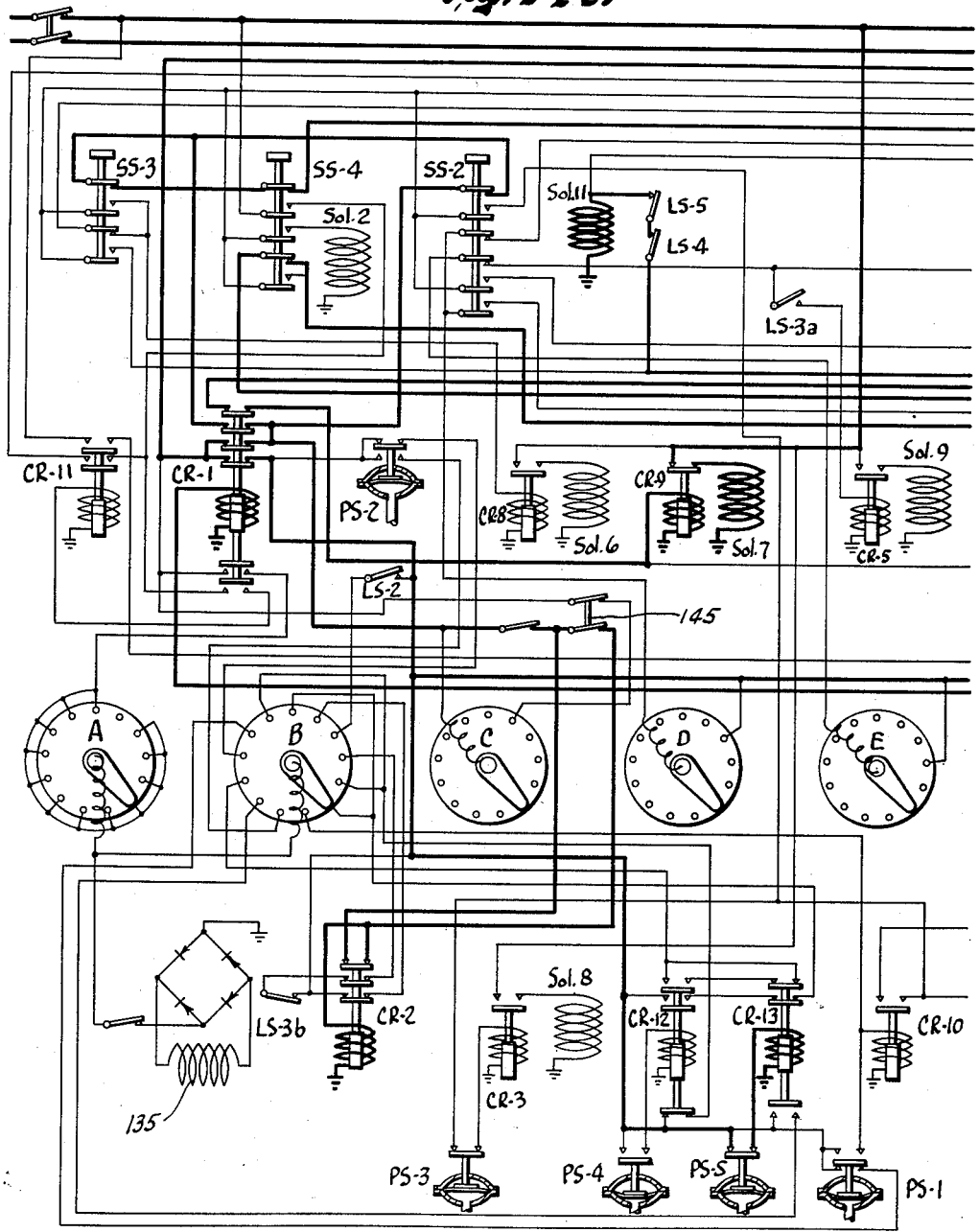
Figure 14C:
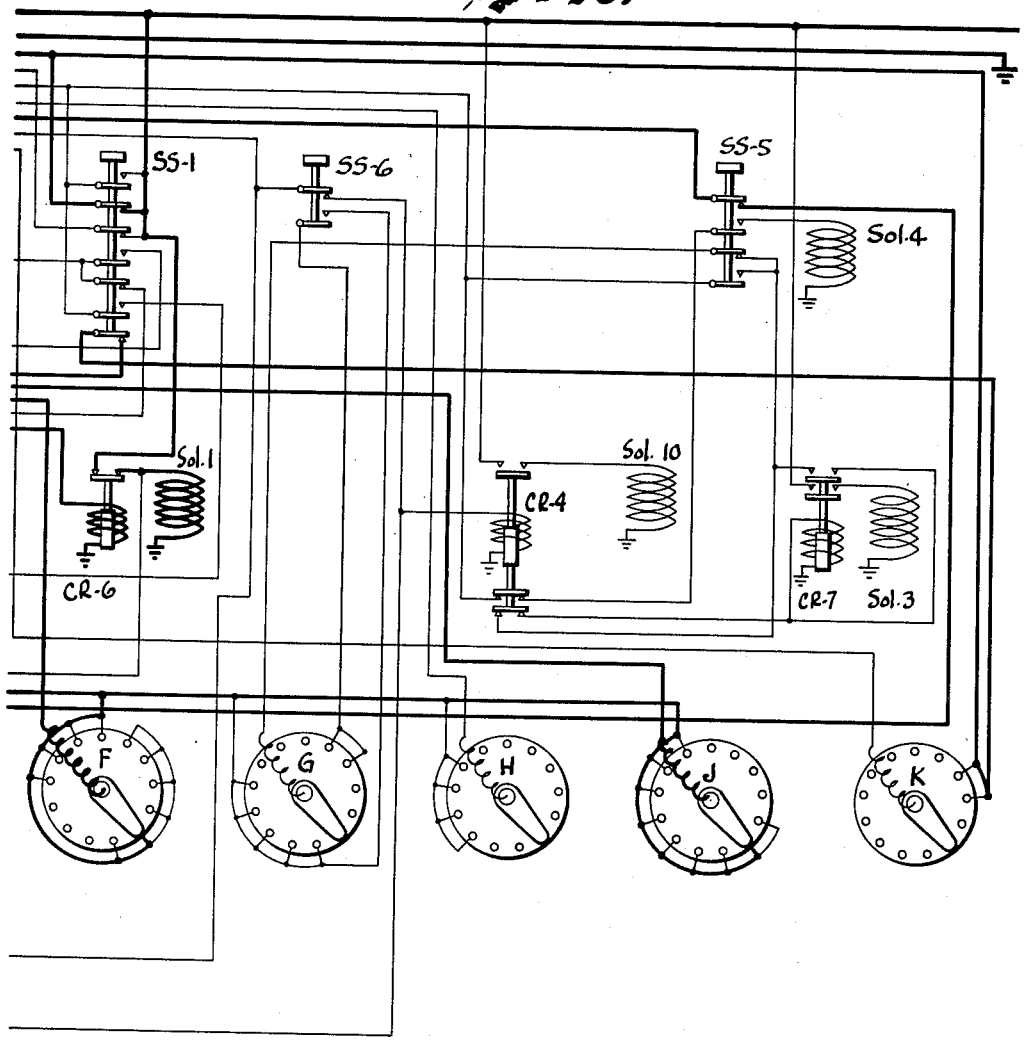
Figure 15A:
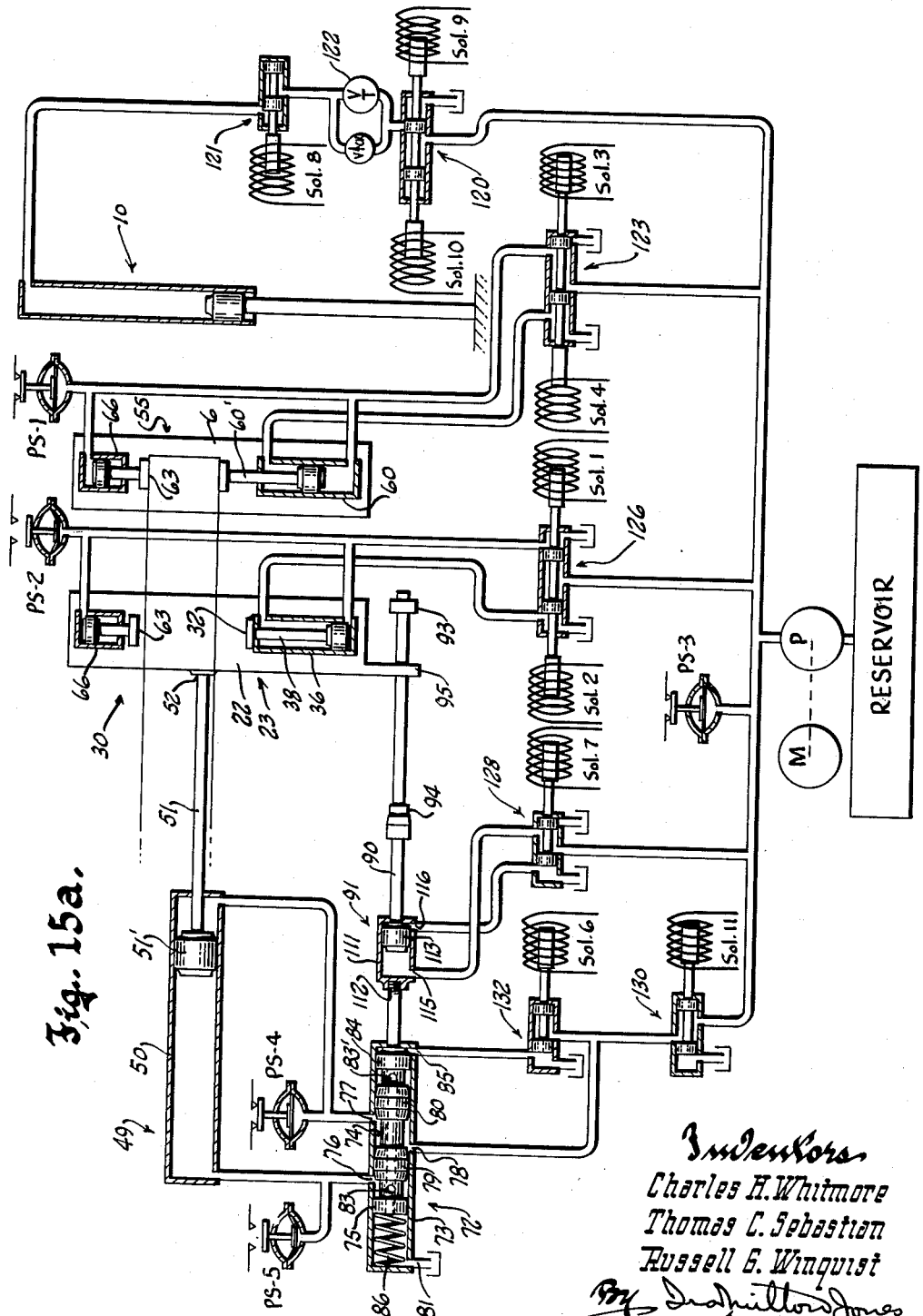
Figure 16B:
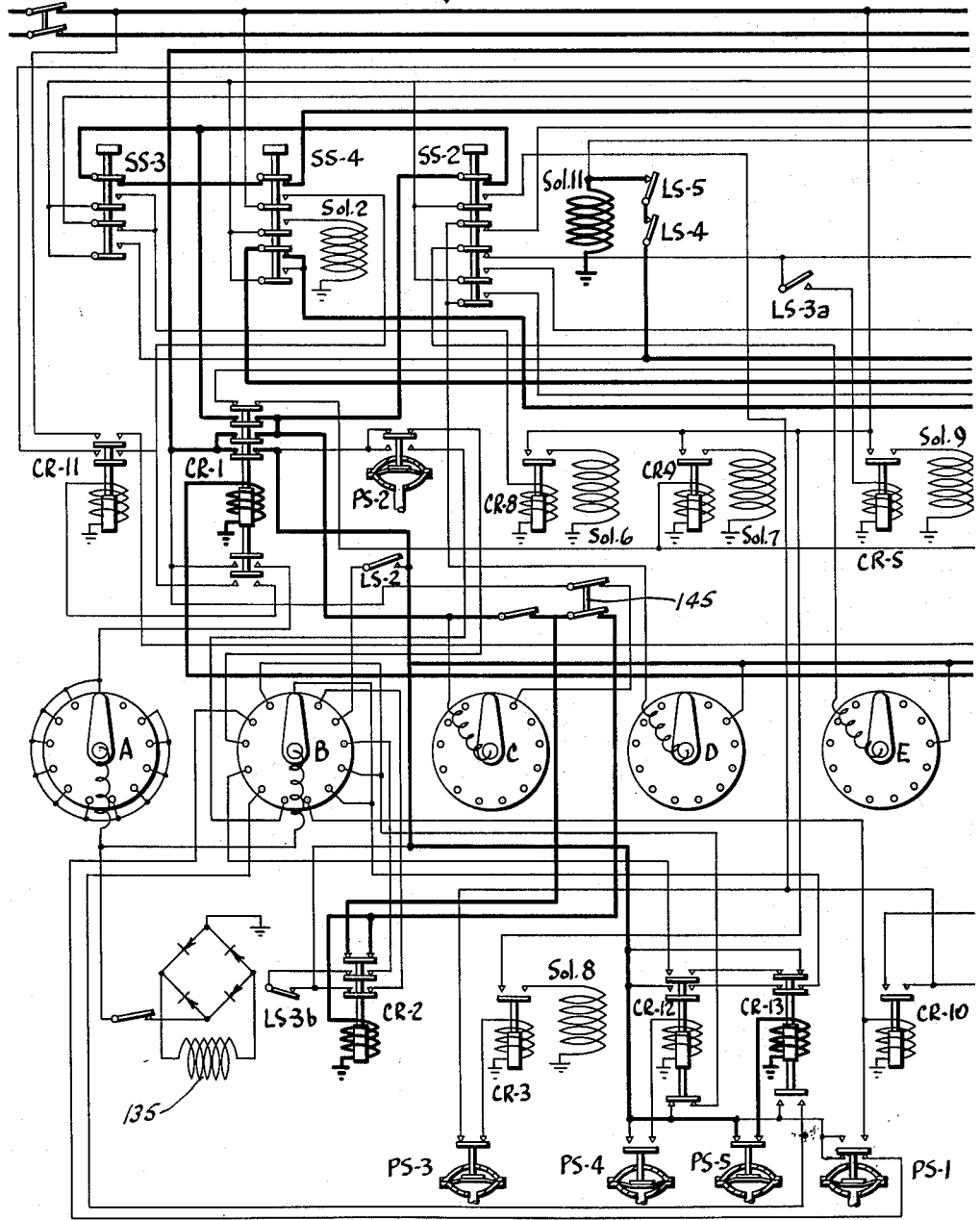
Figure 16C:
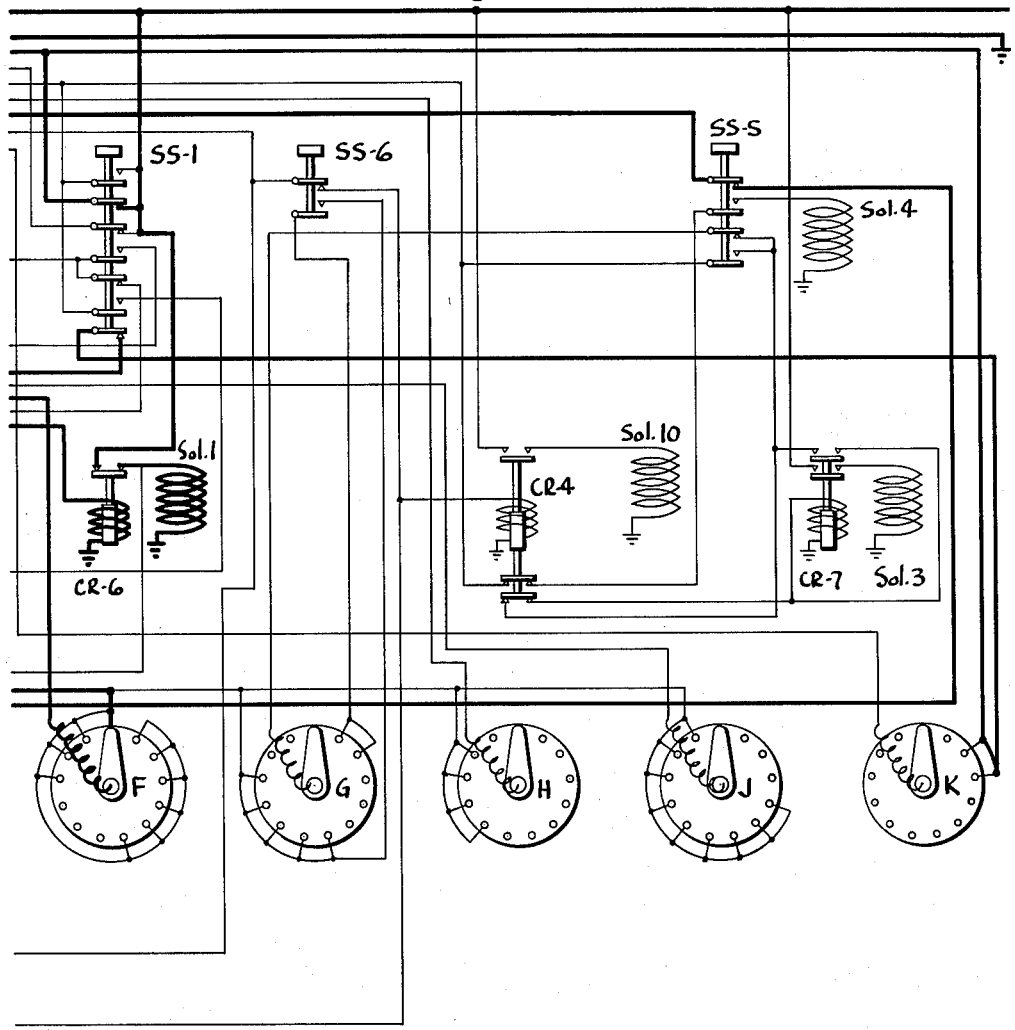

FIGURES 12A, 12B and 12C are diagrammatic views illustrating how the remaining uncut length of stock may be gripped from in front of the cutting plane according to a modified embodiment of this invention, and respectively showing (1) the front vise moved rearwardly into position to grip the protruding front end portion of the stock, (2) the front vise gripping the stock and the rear indexing vise retracted a distance equal to the full length of the piece to be cut, and (3) the front vise open and moved out of the cutting zone and the rear vise advanced to bring the stock into position for the next cut;

FIGURE 13A is a diagrammatic illustration of the hydraulic components of the machine illustrating the same in their respective conditions at that instant in the sequence of operations at which the stock has been positioned to be cut and the saw is in operation cutting through the stock;

FIGURES 13B and 13C together constitute a diagram illustrating the electrical components of the control system, with the portions thereof actively involved at the instant represented in the hydraulic diagram 13A shown in heavy lines;

FIGURE 14A, like FIGURE 13A, is a diagram of the hydraulic components of the machine, but showing the same at the instant the indexing vise has been additionally advanced to place the protruding front end portion of the remaining uncut length of stock in the front holding device—which, of course, occurs after the cutting operation has been completed and the saw elevated out of the way;

FIGURES 14B and 14C together constitute a diagrammatic illustration of the electrical circuitry of the control system, with the portions thereof active at the instant depicted in FIGURE 14A, shown in heavy lines;

FIGURE 15A is again a diagrammatic illustration of the hydraulic components of the machine, illustrating the same at the instant the front holding vise has gripped the front end portion of the stock and the indexing vise has begun its retraction stroke;

FIGURES 15B and 15C together illustrate the electrical circuitry of the system, with those portions thereof active at the instant depicted in FIGURE 15A shown in heavy lines;

FIGURE 16A is again a diagrammatic illustration of the hydraulic components of the machine, illustrating the same at the instant the indexing vise has been retracted and actuated to regrip the stock and has started on its advance; and FIGURES 16B and 16C illustrate the electrical control circuitry of the system at the instant depicted in FIGURE 16A.

Referring now particularly to the accompanying drawings in which like numerals designate like parts throughout the several views, the numeral 3 designates generally the base of a cutoff saw embodying this invention. As in the Crane et al. Patent No. 2,898,669, the base 3 is essentially an oblong, horizontally disposed box constructed of plate stock welded together, with upwardly projecting end sections 4 and 5. Accordingly the base has a U-shaped formation to embrace the work or stock in position to be cut; and to support the work or stock a heavy cast work supporting table 6 is mounted on the base between its end sections 4 and 5.

As in the aforesaid Crane et al. Patent No. 2,898,669, the end sections 4 and 5 of the base are hollow box-like enclosures for the pulley wheels (one of which is indicated at 7 in FIGURE 3) about which the endless saw blade 8 of the machine is trained. The pulley wheels, as in the Crane et al. patent are mounted on a saw head or frame 9 which in turn is mounted in the base for vertical translation. Since the construction of this saw head and the manner in which it is mounted in the base forms no part of this invention, it has not been illustrated in detail. Suffice it to say that the saw head or frame 9 is constrained to vertical translation by means of telescoping posts which also serve as fluid pressure responsive motors to elevate the saw head and control its gravity produced descent. One of these telescoping posts is indicated generally by the numeral 10 in FIGURE 3.

The pulley wheels are of course horizontally spaced so that the stretches of the saw band or blade extending therebetween are horizontal, one above and the other below the work supporting table. Suitable power means (not shown) drives one of the pulley wheels. Since it is the top stretch 11 of the blade or band which does the cutting, this stretch is twisted by means of suitable guides (one of which, indicated by the numeral 12 appears in FIGURE 3), to dispose its medial cutting portion in a fixed vertical plane, with the toothed edge of the band facing downwardly. To minimize the angle through which the top stretch of the band must be twisted and also to locate the bottom stretch of the band in an area or zone which is free from falling chips and coolant, the axes of the pulley wheels are inclined as shown in FIGURE 3. For a more complete description of the saw head, its mounting and the manner in which the stop stretch of the band or blade is guided, reference may be made to the Crane et al. patent.

It is important to an understanding of this invention to observe that the upper cutting stretch of the saw band or blade is constrained to travel in the fixed vertical cutting plane, which intersects the plane of the work supporting table 6 so that the blade cuts through work on the table as the saw head descends.

The work which is generally a length of bar stock or the like, in addition to resting upon the table 6, is supported by a plurality of free running rollers 20 carried by a rearwardly extending base section 21, the tops of the rollers being tangent to a plane coincident to the top of the work supporting table 6.

Like the main base 3, the base section 21 is a box-like unit built up of plate stock welded together and forming a housing in which much of the drive mechanism of the machine may be housed.

The work or stock to be cut is deposited upon the rollers 20 with its front end portion resting upon the table 22 of a carriage indicated generally by the numeral 23. The carriage is mounted for reciprocatory movement across the base section 21 by means of long and short tracks or ways 24 and 24', respectively, at opposite sides of the base section 21, and preferably in the form of round, substantially heavy rods having their front ends fixed to the casting 6 which provides the work supporting table and is mounted on the main base 3, and their rear ends supported from the base section 21.

The carriage 23 may be in the form of a casting extending across the top of the base section 21 to have its opposite ends located above the tracks or ways 24–24', and to slidably mount the carriage on these tracks or ways its opposite end portions are provided with bearings 25. These bearings need not be very long since stability in the mounting of the carriage is provided by an outrigger 26 which projects rearwardly from the side of the carriage at which the longer track 24 is located, to mount a third bearing 27 which is slidably mounted upon the track 24. Accordingly, the carriage is supported at three points which has the obvious advantage of being able to better accommodate any misalignment which may exist in the machine. Preferably the outrigger 26 embraces the track 24, and if desired this track may be supported medially of its ends as at 28.

The carriage 23 carries the indexing vise of the machine, indicated generally by the numeral 30, and by which the work or stock is gripped to be advanced or retracted as the carriage moves forward or back. The vise 30 also holds the work firmly and solidly during the cutting thereof.

The indexing and holding vise 30 comprises a stationary jaw 31, and a movable jaw 32. The stationary jaw is solidly mounted upon the carriage in a position rising perpendicularly from its table 22 at one side thereof; and the movable jaw 32 is slidably hung from an arm 33 which is secured to the top of the stationary jaw 31 and projects horizontally from the stationary jaw above the table 22 of the carriage toward the opposite side thereof where it is supported by a strut 34.

The arm 33 is preferably a casting and, as more particularly illustrated in the cross sectional views FIGURES 7 and 8, is equipped with machined ways 35 with which the upper end portion of the movable jaw 32 is slidably engaged, to thus mount the movable jaw for horizontal translation back and forth toward the fixed jaw 31.

To open and close the vise, i.e., to draw its movable jaw 32 towards the stationary jaw and to move the same away from the stationary jaw, a reversible fluid pressure responsive motor 36 is provided. The cylinder 37 of this motor is fixed to the stationary jaw 31 beneath the arm 33, and its ram 38 which projects from the cylinder in parallel spaced relation to the arm 33 is adapted to be secured to the jaw 32 in either one or the other of two positions. To this end the ram 38 is slidably received in the bore of a bearing block 39 fixed to the jaw, and has a pair of downwardly opening notches 40 and 41 to receive a spring loaded latch 42.

The latch 42 comprises a round plunger slidably mounted in the bearing block 39 with its upper end bearing against the underside of the ram to snap into one of the notches as it is brought into alignment with the plunger by relative motion between the ram and the movable jaw. Preferably the underside of the ram between its notches is slabbed off as at 43 to provide abrupt shoulders 44 and 45 respectively adjacent to the notches 40 and 41 to limit relative movement between the ram and the movable jaw and automatically guide the plunger into engagement with the notches.

Since the overhead mounting of the movable vise accommodates or permits the use of a long stroke fluid pressure motor to open and close the vise, only two positions of the movable jaw with respect to the ram are needed to accommodate the entire range of work sizes for which the machine is designed. Thus, for purposes of illustration, engagement of the latch in the inner notch 40 gives the vise a range of zero to twelve inches (0–12″) and engagement of the latch in the outer notch 41 gives the vise a range of eight to twenty inches (8–20″).

Retraction of the latch may be quickly effected by rotating a handle 46 which has its inner end portion journalled in the bearing block 39, and has a driving pin 47 projecting eccentrically therefrom and into a slot 48 extending crosswise of the latch. Thus, upon rotation of the handle 46 from the position shown in FIGURE 7 to the position shown in FIGURE 8, the latch may be withdrawn from engagement with the notch it occupied and held in position to ride upon the flat surface 43 to thus enable the ram 38 to be moved endwise with respect to the movable vise jaw.

The carriage is slid along its tracks or ways 24 and 24′ to advance or retract the work or stock gripped by its vise 30, by means of a reversible fluid pressure responsive motor indicated generally by the numeral 49. The cylinder 50 of this motor is fixed with respect to the base section 21, and its ram 51 which projects forwardly from the cylinder is connected to the carriage as at 52. The stroke of the motor 49 and hence the distance the carriage moves between its foremost and rearmost positions is adjustable and is controlled in a manner to be hereinafter described.

In a position somewhat short of its foremost limit of travel, the carriage carried vise 30 is directly to the rear of the fixed cutting plane to hold the work or stock while it is being cut.

A second vise, indicated generally by the numeral 55 is located just in front of the cutting plane. This second vise is essentially a duplicate of the carriage carried vise 30, except that it is stationarily mounted on the base 3. Accordingly, its stationary jaw 56 is fixed to the base of the machine and rises perpendicularly from the table 6 at one side thereof. Also, as in the other vise, the movable jaw 57 is slidably hung from an arm 58, which is fixed to the stationary jaw 56 and extends horizontally across the table 6 toward the opposite side thereof, where it is supported by a post or strut 59. The manner in which the movable jaw 57 is mounted upon the arm 58 is the same as it is in the other vise and, as in the other vise, a reversible fluid pressure responsive motor 60 is provided to draw the movable vise jaw toward the stationary jaw or project it therefrom; and again as in the case of the other vise, the movable jaw may be locked to the ram 60′ of its fluid pressure responsive motor in either of two positions.

The cooperative relationship between the indexing and holding vise 30 and the front vise 55, is graphically illustrated in the diagrammatic views FIGURES 11A, 11B, and 11C. In the first of these three figures, the stock is shown being gripped by the indexing vise 30, and held thereby during the cutting operation. At this time the vise 55 is of course open. The cutting plane is indicated and the length of the stock protruding beyond this plane is the length of the piece to be cut off, this length being indicated by the capital letter L in FIGURE 11A.

After the saw has cut through the stock, the control system of the machine causes the indexing vise 30 to impart an additional advance to the uncut length of stock, as depicted in FIGURE 11B. In an actual embodiment of the invention, this additional advance of the stock is one and a half inches (1½″). It is, of course, understood that at this time the saw head is elevated and that consequently the saw band is out of the way. This additional advance of the indexing vise and the stock gripped thereby places the front end portion of the stock, which protrudes beyond the vise 30 into the range of or into the bite of the front vise 55, as clearly shown in FIGURE 11B.

Thereafter, the control system functions to close the vise 55, as shown in FIGURE 11C, to grip and hold the uncut length of stock while the indexing vise 30, after being opened, is retracted to take a new bite upon the stock and then repeat the sequence.

Although as noted hereinbefore, it is preferable to have the front vise 55 stationary as described, and to impart an additional advance to the uncut length of stock to project its protruding front end portion into the vise 55, the really important consideration—at least from the standpoint of the method aspect of the invention—resides in the fact that after the cutting operation the protruding front end portion of the remaining length of stock is gripped from in front of the cutting plane so that the means employed to do this does not interfere with the advance of the indexing vise into close proximity to the rear of the cutting plane.

Hence, the broad objectives of this phase of the invention could be attained by manipulating the vises in the manner diagrammatically illustrated in FIGURES 12A, 12B and 12C. FIGURE 12A show the stock being gripped by the indexing and holding vise 30′ and the front vise 55′ moved rearwardly beyond the cutting plane from in front thereof into a position to grip the protruding front end portion of the stock. It is of course understood that for this to occur the cutting operation must have been completed and the saw elevated.

In FIGURE 12B, the front end portion of the stock has been gripped by the front vise 55′ and the indexing vise 30′, after first being opened, has been retracted a distance equivalent to the full length of the piece to be cut; and in FIGURE 12C the front vise 55′ is shown returned to its inactive position out of the cutting zone and the rear vise gripping the stock which has been advanced into position for the next cut.

Inasmuch as the machine of this invention is intended to handle relatively heavy lengths of stock or work, and since in every instance the stock or work is clamped against the stationary jaws of the vises, there would be a considerable amount of friction between the stock and the stationary jaws of the vises, resisting movement of the work or stock by the indexing vise unless some means were provided to eliminate or greatly reduce this friction. This is accomplished by providing each of the two stationary vise jaws with a retractable pressure applying shoe 61. This shoe is hinged to the jaw as at 62 to swing about a vertical axis to and from a position projecting its work engaging face 63 towards the movable jaw and against the work.

A spring 64 acts upon the shoe through an arm 65 which is integral with the shoe, to retract it; while a fluid pressure responsive motor 66 mounted in the jaw acts upon the arm 65 to project the shoe towards the work whenever this motor is connected with a source of fluid pressure. An adjustable stop 67 limits the motor produced motion of the shoe.

By connecting and disconnecting the fluid pressure source simultaneously with the motors 66 and the vise closing motors, the pressure applying shoes will be operative to engage the work when the vises are closed and will be ineffective to resist endwise movement of the stock when the vises are open.

As pointed out hereinbefore, the carriage 23 which carries the indexing vise 30 is advanced and retracted by means of the reversible fluid pressure responsive motor 49, the cylinder 50 of which is mounted on the rearward extension 21 of the base in a fixed position beneath the rollers 20. The opposite ends of the cylinder 50 are selectively connectable either with a source of fluid pressure or a tank return under the control of a valve 72. The valve 72 is mounted upon the base section 21 beneath the long carriage-supporting guide track 24, and comprises a body 73 having a bore 74 in which a spool 75 is slidably received.

The valve body 73 has two service ports 76 and 77 opening to its bore 74 at axially spaced points, and between these two ports the valve body has an inlet port 78 opening to its bore. The service ports are respectively connected with the rear and front ends of the cylinder 50 of the fluid pressure responsive motor 49 through suitable high pressure lines, and the inlet port 78 is connectible with a source of fluid pressure. Axially spaced circumferential lands 79 and 80 on the spool enable the spool to control communication between the inlet ports 78 and the service ports 76 and 77.

The lands 79 and 80 are spaced apart a distance corresponding to the spacing between the service ports 76 and 77, and the width of these lands is slightly less than the diameter of the mouths of the service ports. Hence, when the spool is in a neutral position aligning its lands 79 and 80 with the ports, communication between the service ports and the bore is almost closed off. This condition, somewhat exaggerated, is illustrated in FIGURE 9a.

The rear end of the bore 74 is connected with the tank or return of the hydraulic system through a port 81, and an exhaust passage 82 extends axially into the spool from its rear end to connect this return port with the bore to the rear of the land 79 and in front of the land 80 through cross bores 83 and 83'.

At its front end and forwardly of the cross bores 83' the spool has a third land 84 which provides a piston against which fluid pressure manifested in the front end portion of the bore may exert a rearward thrust upon the spool. To enable such pressure to be built up in the front end portion of the bore, the valve body has a supply port 85 opening thereto forwardly of the third land 84. The fluid pressure on the piston 84 is opposed by the forward thrust imparted to the spool by a spring 86, which is confined between the rear end of the spool and the bottom of a closure cap 87 fixed to the valve body 73.

The fluid pressure in the front end of the bore 74 will overpower the spring 86 when full system pressure is applied thereat while the spring will move the spool assembly to its extreme opposite position when this pressure is removed. The manner in which the spool is moved to and held in its neutral position will be described hereinafter. At this point, it is sufficient to note that when the spool is in its neutral position the pressure at opposite sides of the piston 51' of the fluid pressure responsive motor 49 is equal, to thus hold the carriage against movement in either direction. As will be obvious, such "locking" of the motor may be effected at any point along the length of its stroke, so that the advance of the carriage, and, of course, the indexing and holding vise 30 mounted thereon, may be stopped and held at the exact point needed to properly present the work or stock to the saw.

After the sawing operation has been completed, the spool may be shifted to connect the pressure source with the rear end of the cylinder 50 and the front end thereof with the tank return. This brings about a further advance of the carriage to place the protruding front end portion of the remaining length of the stock in the front vise, at which time the carriage may be stopped again by bringing the spool to its neutral position.

To effect retraction of the carriage the spool must be shifted in the opposite direction from its neutral position, i.e. forwardly, whereupon the front end of the cylinder 50 is connected with the pressure source and the rear end with the tank return. The retraction may be halted wherever desired by simply returning the spool to its neutral position.

As will be understood, the spool may be shifted axially toward the rear by connecting the front end of the bore 74 with the source of fluid pressure, and shifted axially toward the front by disconnecting the front end of the bore from the fluid pressure source and allowing the spring 86 to move the spool.

The spool may also be shifted to its neutral position, in either direction, by transmitting motion thereto from the carriage. To do this, a rod 90 is connected to the spool through a two-position coupling device 91, to be hereinafter more fully described. Preferably the rod 90 is coaxial with the spool, but in any event it is lengthwise parallel to the movement of the carriage, being supported at its rear end from the spool through the coupling 91 and at its front end by a bearing 92 fixed to the forward end portion of the base section 21.

Two stops 93 and 94 are mounted on the rod 90 to be engaged by an abutment 95 which travels with the carriage and preferably is fixed directly thereto. As best seen in FIGURES 2 and 3, the abutment 95 is in the form of a yoke embracing the rod 90.

The stop 93 is fixed solidly to the rod 90 and is located in front of the abutment 95 to be engaged thereby during advance of the carriage. The stop 94 is located to the rear of the abutment 95 and is engaged thereby during retraction of the carriage. This stop 94 is adjustable lengthwise of the rod 90, and by means of this adjustment the length of the retraction stroke of the carriage may be determined.

In either case, whether it be the stop 93 or the stop 94 that is engaged by the carriage abutment 95, the resulting axial motion of the rod 90 is imparted to the spool 75. Bearing in mind that, for the carriage to be moving the spool must have been shifted from its neutral position—rearwardly to effect advance of the carriage and forwardly to effect retraction of the carriage—it follows that the collision of the carriage abutment with either of the stops 93 or 94 returns the spool to its neutral position, and stops the carriage.

Since, as best seen in FIGURE 9a, the service ports 76 and 77 are not fully blocked off by the lands 79 and 80 when the spool is in its neutral position to which it is returned by abutment 95 colliding with either of the stops 93 or 94, a small quantity of fluid will pass at this time from the high pressure inlet port 78 through the service ports and across the lands 79 and 80 to be discharged through cross bores 83 and 83' into the exhaust passage 82. The resistance to flow of the fluid through this restricted communication sets up a fluid pressure in both service ports 76 and 77, and consequently at opposite sides of piston 51', equal to about one half the pressure applied at the inlet port 78. Any slight deviation of the spool from its exact neutral will change this resistance and correspondingly alter the pressure manifested at the ports 76 and 77 and the corresponding motor ports. This causes the carriage to be moved back to the correct position as sensed by the stops 93 or 94 being engaged by the abutment 95.

Relatively little pressure and only a short travel is required to shift the spool of the valve, and since the hydraulic system responds practically instantaneously, the carriage is stopped exactly where it should be, despite the fact that great force is required to move it. Moreover, the starting and stopping of the carriage—and especially the latter—is obtained without strain upon any of the mechanism such as would be the case if mechanical stops were employed to arrest the motion of the carriage.

The adjustable stop 94 comprises a sleeve 96 slidably mounted on the rod 90 and constrained against rotation with respect thereto by a key 97 riding in a slot 98 in the rod. The key 97 may be simply the inner end of a screw threaded into the sleeve. The front end portion of the sleeve 96 has a smooth cylindrical outer surface with a scale 99 delineated thereon, the scale being in tenths of an inch. The rear end portion of the sleeve has a barrel 101 threaded thereon, the front end portion of which telescopes over the smooth surfaced front end of the sleeve and covers the scale 99 thereon to an extent determined by the relative positions of rotation of the barrel and sleeve. Consequently the front edge or extremity 102 of the barrel may coact with the scale 99 to effect fine adjustment of the stop 94.

Also slidably mounted upon the rod 90 is a collar 103 which is secured against rotation with respect to the rod by a pin 104 carried by the collar and riding in the slot 98. A spring pressed plunger 105 mounted in the collar is engageable in any selected one of a number of holes 107 spaced exactly one inch apart along the length of the rod 90, to releasably secure the collar to the rod at a point determined by the length of the piece to be cut. Securement of the collar 103 to the rod also holds the barrel against endwise movement because of a snap ring connection 108 between the collar and the barrel.

With the collar 103 and the barrel 101 thus secured against endwise movement with respect to the rod, rotation of the barrel 101 propels the sleeve 96 axially one way or the other along the rod. The stop 94, which is actually provided by the front end 109 of the sleeve 96, thus may be accurately located on the rod 90 by reference to the one-inch scale on the rod 90, the tenth-of-an-inch scale 99 on the sleeve 96, and a micrometer scale 110 on the exterior of the barrel coacting with a suitable indicator on the sleeve.

With the setting of the adjustable stop 94 as shown in FIGURE 9, the length of the pieces into which the stock will be cut is exactly twenty inches (20").

It should be borne in mind that inasmuch as the uncut remaining length of stock is advanced one and one-half inches (1½") after the cutting operation, the actual distance the carriage is retracted must be eighteen and one-half inches (18½") plus the saw kerf width if the length of the piece is to be twenty inches (20"). However, to obviate the need for subtracting the one and one-half inches from the desired length of the piece in setting the adjustable stop 94, the scale along the length of the rod 90 is so placed as to take into account the initial one and one-half inches advance. In other words, the operator merely sets the adjustable stop 94 in accordance with the one-inch scale on the rod 90, without regard for the initial one and one-half inch advance of the stock which takes place at the conclusion of each cut.

The two-position coupling 91 provides the means whereby advance of the carriage may be stopped when the work is in its proper position to be cut and then, after the cutting operation, may be advanced an additional amount—namely, the one and one-half inches hereinbefore referred to. To do this, the two position coupling 91 couples the rod 90, and hence the stops 93 and 94 thereon, to the spool 75, in either of two predetermined positions spaced exactly one and one-half inches apart.

The coupling comprises a cylinder 111 rigidly fixed to the front end of the spool 75, as at 112, and a piston 113 on the rear end of the rod 90, slidably received in the cylinder. The stroke of the piston in the cylinder is exactly one and one-half inches (1½") and to hold the piston at one or the other of its two limits of motion, the opposite ends of the cylinder bore are selectively connectable through ports 115 and 116 with the source of fluid pressure.

Connection of the port 116 with the source of fluid pressure causes the piston, and consequently the rod to be moved to their rearwardmost positions with respect to the spool 75, while connection of the port 115 with the pressure source shifts the piston 113 and the rod 90 to their foremost positions with respect to the spool 75.

As will be more fully developed hereinafter, during advance of the carriage to bring the work to its position to be cut, the port 116 is connected with the fluid pressure source so that the fixed stop 93 on the rod 90 is in position to be engaged when the carriage reaches its position presenting the work for cutting; and after the cutting operation is completed, the other port 115 is connected to the pressure source and the port 116 is connected to the fluid return so that the stop 93 is moved out of engagement with and forwardly of the carriage carried abutment 95. This permits the spool 75 to be shifted to bring about additional advance of the carriage which continues until the abutment 95 again engages the stop 93 and moves it and the rod 90 to shift the spool 75.

*The control system (FIGURES 13A to 16C, inclusive)*

As noted hereinbefore, the various motions of the component parts of the machine necessary to carry out its function, are produced by fluid pressure responsive motors, but the functioning of these motors is controlled electrically. The diagrammatic illustrations 13A, B and C to 16A, B and C, inclusive, illustrate the hydraulic and electrical systems at four different stages of the cycle—namely, and respectively:

(1) That stage of the cycle during which the work is actually being cut by the saw;

(2) That stage in the cycle after the sawing operation has been completed and the saw head elevated, when the indexing vise 30 has advanced the stock one and one-half inches (1½") beyond the position it occupied during the cutting operation;

(3) That stage of the cycle at which the protruding front end portion of the remaining uncut length of stock is gripped by the front vise 55, and the indexing vise has released its grip upon the stock and is ready to be retracted; and (4) That stage in the cycle at which the indexing vise 30 has arrived at the limit of its retraction and has regripped the stock preparatory to again advancing it into cutting position.

In each of these sets of diagrammatic views, the first illustrates the hydraulic system and the second and third together illustrate the electrical circuitry, with those portions of the circuit which are active at the instant in the cycle which is depicted, shown in heavy lines.

Much of the hydraulic system has already been described, at least as to the physical aspect thereof, but to coordinate the entire hydraulic system, reference is now particularly directed to FIGURES 13A, 14A, 15A and 16A. As will readily appear from an examination of these views, fluid pressure for the entire system is provided by an electric motor driven pump P which takes oil from the reservoir and pumps it to the various hydraulic components through the lines shown on these views under the control of solenoid actuated valves.

Thus, fluid pressure derived from the pump P is supplied to the cylinders of the telescoping post structures 10 to elevate the saw head, under the control of a solenoid actuated valve 120, and is allowed to leave these cylinders upon opening of a solenoid actuated valve 121. The valve 120 is a three-position spring centered and solenoid actuated valve. It is shifted one way from its centered position upon energization of solenoid Sol 9 and in the other direction by energization of solenoid Sol 10. When the solenoid Sol 10 is energized, the valve is in the position illustrated in FIGURE 13A disconnecting the cylinders of the telescoping posts 10 from the fluid pressure source, and allowing the saw head to descend when the other valve 121 opens; but when the solenoid Sol 9 is energized, the valve 120 is in a position to connect the cylinders of the telescoping posts 10 with the pressure source to elevate the saw head. In FIGURE 13A, the solenoid Sol 10 is energized since, at this instant in the cycle, the saw head is descending.

The valve 121 is biased to a position disconnecting the cylinders of the telescoping posts from the low pressure or tank return and holding the saw head in its elevated position; but when its solenoid Sol 8 is energized, as it is in FIGURE 13A, the valve 121 is open to allow the fluid in the cylinders of the telescoping posts to escape and permit the saw head to descend at a rate determined by the setting of an adjustable throttling valve 122.

The fluid pressure motor 60 by which the vise 55 is closed has its opposite ends selectively connectable either with the pressure source developed by the pump P, or the tank return, under the control of a self-centering solenoid actuated valve 123. In the centered position of this valve 123, neither end of the fluid pressure responsive motor 60 is connected with the pressure source, but its outer end is connected with the tank return. Accordingly, the vise 55 is in its open or relaxed condition. The fluid pressure responsive motor 66, which actuates the pressure applying shoe 61 of the vise 55 is also connected with the tank return at this time.

The spool of the valve 123, which as noted hereinbefore is self-centering, is adapted to be drawn in one direction by energization of a solenoid Sol 3, and in the other direction by a solenoid Sol 4, the latter, however, is utilized only during manual operation to effect retraction of the movable jaw of the vise 55 as when the machine is being first set up.

Upon energization of the solenoid Sol 3, fluid pressure is manifested in the motors 60 and 66 of the vise 55 to effect closure of the vise and gripping of the stock, but, as noted hereinbefore, this does not occur until after the sawing operation has been completed, the saw head elevated, and the indexing vise advanced to project the protruding front end portion of the stock into the vise 55.

A similar self-centering valve 126 governs connection of the fluid pressure responsive motor 36 of the indexing vise 30 and the motor 66 of its retractible pressure-applying shoe with the fluid pressure source. Since the vise 30 is closed and gripping the stock in the condition of the machine depicted in FIGURE 13A, the motors 36 and 66 are connected with the pressure source, this having been accomplished by energization of the solenoid Sol 1. The solenoid Sol 2, which draws the spool of the valve 126 in the opposite direction, like the solenoid Sol 4, is not employed during automatic functioning of the machine.

The cylinder 111 of the two-position coupling 91 has its opposite ends selectively connected with the fluid pressure source under the control of a solenoid valve 128. The spool of this valve is biased to the position in which it is illustrated in FIGURE 13A, and is shifted to its opposite position by energization of a solenoid Sol 7.

In FIGURE 13A, the valve 128 so connects the cylinder 111 of the two-position coupling 91 with the fluid pressure source as to hold the rod 90, and consequently the fixed stop 93, in the position to effect stopping of carriage advance when the work arrives at its correct position for cutting. To do this the slight motion imparted to the rod 90 by the engagement of the carriage carried abutment with the stop 93, must be transmitted to the spool 75, and this requires the maintenance of pressure in the forward end of the cylinder 111, which condition is assured by de-energization of the solenoid Sol 7.

As noted hereinbefore, the cylinder 50 of the fluid pressure motor 49 which drives the carriage back and forth, has one or the other of its ends connectable with the pressure source, i.e. the pump P, under the control of the valve 72. The manner in which this is accomplished has already been rather fully explained, but to properly orient this portion of the hydraulic system with the remainder thereof, it should be noted that the connection of the inlet 78 of the valve 72 with the fluid pressure source is controlled by a solenoid-actuated valve 130. This valve 130 is biased to a closed position and held open as long as its solenoid Sol 11 is energized. It is this latter condition of the valve 130 which is illustrated in all of the FIGURES 13A, 14A and 15A. In fact, the solenoid Sol 11 is energized as long as the system is turned on for automatic operation.

Communication of the front end of the bore 74 of the control valve 72 with the pressure source to shift the spool 75 rearward is controlled by a biased solenoid-actuated valve 132. In its biased condition shown in FIGURE 13A, this valve 132 communicates the front end of the bore 74 with the pressure source, and in its opposite position, to which it is moved by energization of its solenoid Sol 6, it connects the front end of the bore 74 with the tank return.

In addition to the hydraulic components thus far mentioned, there are also a number of pressure actuated switches identified as PS–1, PS–2, PS–3, PS–4 and PS–5. Pressure switch PS–1 is closed whenever the vise 55 is closed. Pressure switch PS–2 is closed whenever the indexing vise 30 is closed, as it is in FIGURE 13A. Pressure switch PS–3 is closed whenever the hydraulic system is functioning, being responsive directly to the pump outlet. Pressure switches PS–4 and PS–5 are closed whenever sufficient fluid pressure obtains in the cylinder 50 of the carriage actuating motor.

Although the hydraulic components are illustrated in different conditions in the views 13A, 14A, 15A and 16A, the foregoing description thereof will suffice for an understanding thereof in each of these several views.

As already shown, the functioning of the various hydraulic components—or, more specifically, the opening and closing of the valves which control them, is under the control of an electrical sequencing system. The heart of this electrical sequencing system is a rotary programming switch having a plurality of wafer-like rotors identified in the electrical circuits, FIGURES 13B, 13C, 14B, 14C, 15B, 15C, 16B and 16C, by the letters A, B, C, D, E, F, G, H, J and K. All of these rotors are connected to rotate stepwise in unison in response to successive energization of an indexing solenoid 135.

Since this rotary programming switch is available upon the open market under the trademark "Ledex" no effort has been made to illustrate the manner in which energization of its indexing solenoid 135 effects the desired stepwise rotation of the several wafers or rotors, nor to show the structure of the switch. Whenever the solenoid 135 is energized, either in response to closure of one of several limit switches, or any one of the previously identified pressure responsive switches, the switch is indexed to its next position.

Thus, for instance, by closure of limit switch LS–2 at the completion of the cut—and, more specifically, upon completion of descent of the saw head, solenoid 135 is connected with its source of voltage, i.e., the direct current delivered by the illustrated rectifier—to effect indexing of the rotary switch to its next position.

The circuit by which this energization of the solenoid 135 is effected upon closure of the limit switch LS-2 can be readily traced on the diagram.

At the stage in the cycle depicted in the diagrammatic FIGURES 13A, 13B and 13C, solenoids Sol 1, 8, 10 and 11 are energized, as noted hereinbefore in connection with the description of the hydraulic system—and particularly with reference to FIGURE 13A. Solenoid Sol 1 is energized because of the closure of its solenoid actuated control switch CR-6; solenoid Sol 8 is energized by virtue of the closure of its switch CR-3, and the pressure responsive switch PS-3; solenoid 10 is energized because of the closure of its solenoid-actuated control switch CR-4; and solenoid Sol 11 is always energized as long as the system is on automatic control.

At this point it might be noted that the selection of "automatic" or "manual" control of the system is made by the actuation of switches SS-1, SS-2, SS-3, SS-4, SS-5 and SS-6. All of these switches are conveniently placed upon the console 140 on the front of the machine, as shown particularly in FIGURE 1. By means of these manually operable switches, any of the various functions of the control system may be duplicated manually, but in the various electrical diagrams all of them are shown in the positions they occupy when the circuit is set for automatic operation.

Since it is essential that all of the manually controlled switches SS-1-SS-5, inclusive, must be in their "automatic" positions shown in the diagrams before the system is operative for automatic control, an interlocking master control switch CR-1 is provided. Closure of the circuit for energizing the coil of this switch requires all of these manual switches to be closed. Manual switch SS-6 merely controls opening and closing of the front vise 55.

Since the circuitry of FIGURES 13B and 13C to 16B and 16C, respectively, is complete in each instance, and the portions thereof which are active at the different times in the cycle depicted in these views are in heavy lines, to facilitate their corelation with their respective hydraulic diagrams, FIGURES 13A-16A, inclusive, no need is seen for tracing the various circuits in detail. Instead, the following summary is believed to be sufficient for a complete understanding of the method in which the electrical control system functions to effect the desired sequence of operation.

In FIGURES 13A, 13B and 13C, the rotary programming switch is in its second position, and as a result solenoids Sol 8 and Sol 10 are energized to effect lowering of the saw head. Solenoid Sol 1 is, of course, also energized, since the indexing and holding vise 30 is closed at this time—and, as noted hereinbefore, solenoid Sol 11 is closed throughout the entire automatic cycle.

When the saw head reaches the bottom of its travel and the stock has been sawed through, limit switch LS-2 is closed and, as a result, the rotary programming switch is indexed to its third position.

With the programming switch in its third position, the solenoid Sol 10 is deenergized and solenoid Sol 9 is energized to effect elevation of the saw head. When the saw head reaches its top position, a limit switch with two sets of contacts, LS-3A and LS-3B is actuated. Contact LS-3A is normally closed, and the other contact LS-3B is normally open. Consequently, when the head is fully elevated these switches LS-3A and LS-3B respectively open the circuit of solenoid Sol 9 and close the circuit for the indexing of the rotary programming switch, which then moves to its fourth position.

With the rotary programming switch in its fourth position, solenoid Sol 7 is energized to effect the start of the one and one-half inch (1½") advance of the stock to place its front end portion in the front vise 55. As soon as the carriage begins its advance to produce this one and one-half inch advance, the pressure in the front end of the cylinder 50 of the motor 49 drops, causing the pressure responsive switch PS-4 to open. This results in the programming switch being indexed to its fifth position.

In the fifth position of the rotary programming switch which is illustrated in FIGURES 14A, 14B and 14C, all of the solenoids and the valves controlled thereby remain in the same positions they occupied in the fourth position of the programming switch, until the pressure responsive switch PS-4 is again actuated, which takes place at the completion of the one and one-half inch advance of the carriage. When this occurs, the valve spool 75 is brought to its neutral position stopping advance of the carriage, and the rotary programming switch is indexed to its sixth position as a result of pressure switches PS-4 and PS-5 having closed.

In the sixth position of the programming switch, solenoid Sol 3 is energized to effect closure of the front vise 55, and as a result thereof pressure responsive switch PS-1 is actuated to effect indexing of the rotary programming switch to its seventh position.

When the programming switch arrives at its seventh position, solenoid Sol 1 is de-energized to release the grip of the indexing and holding vise 30 upon the stock, and as soon as the pressure which had maintained this vice closed drops, pressure responsive switch PS-2 closes a circuit to index the rotary programming switch to its eighth position.

In the eighth position of the programming switch, solenoid Sol 6 is energized thus allowing the spring 86 to shift the spool 75 forwardly and thereby effect retraction of the carriage. As the programming switch reaches its eighth position, pressure responsive switch PS-5 is de-actuated and, as a result, the rotary programming switch is indexed to its ninth position, which position is illustrated in FIGURES 15A, 15B and 15C.

In the ninth position of the programming switch, none of the valving of the hydraulic system is changed, and all of the solenoids remain in the conditions they were in position 8, until the pressure responsive switch PS-5 is again actuated. The ninth position is maintained until the carriage reaches the limit of its retraction, at which time the spool 75 is shifted to its neutral position stopping the carriage, and causing the pressure switch PS-5 to be actuated. This indexes the rotary programming switch to its tenth position.

In the tenth position of the programming switch, solenoid Sol 1 is energized to close the indexing and holding vise 30, and when this happens, pressure switch PS-2 is actuated to index the programming switch to its eleventh position.

In the eleventh position of the programming switch, solenoid Sol 3 is deenergized allowing the front vise 55 to relax or assume an open or work receptive position. Concomitantly, pressure responsive switch PS-1 drops allowing its normally closed contact to close and thereby effect indexing of the rotary programming switch to its twelfth position.

With the programming switch in its twelfth position, solenoid Sol 6 is deenergized to effect the start of the forward travel of the carriage in consequence of the valve spool 75 being shifted to the rear. As soon as the carriage begins its advance, the pressure on the pressure responsive switch PS-4 decreases, allowing that switch to drop out and this effects indexing of the rotary programming switch to its thirteenth position.

In the thirteenth position of the programming switch, solenoid Sol 7 is deenergized to actuate the two-position coupling 91 to its position at which the stationary stop 93 is in position to be engaged by the carriage abutment when the carriage reaches the position at which the work is properly presented to the saw for cutting. All other solenoids remain in the same conditions they were in the twelfth position of the programming switch until the pressure switch PS-4 is again actuated. This occurs when the carriage is stopped and the work is in position to be cut. The completion of the circuit through pressure switches PS–4 and PS–5 now activates the programming switch to restore the same to its first position.

If the cycle start switch 145 is closed, as it is in all of the diagrams, the programming switch will be actuated to its second position and the entire sequence will be repeated.

From the foregoing description taken in connection with the accompanying drawings, and particularly the diagrammatic illustrations FIGURES 13A to 16C, inclusive, those skilled in this art should have no difficulty in fully appreciating and understanding how the machine of this invention functions, and that this invention provides a greatly improved method of cutting lengths of bar stock into pieces of predetermined uniform length, by virtue of which a serious disadvantage of prior methods of cutting stock and machines for doing so is eliminated—namely, objectionably long stub ends.

It should also be apparent to those skilled in this art that this invention achieves far greater accuracy in cutting stock into pieces of specified length, and, in general, provides a machine which is more flexible in its adaptation to various purposes and in addition is capable of performing its operations more rapidly and efficiently than was heretofore possible.

What is claimed as our invention is:

1. A machine for cutting a length of stock into shorter pieces of selected length comprising: a power driven saw to cut transversely through the stock along a defined fixed plane; a carriage at the rear of the cutting plane; means mounting the carriage for movement along a path substantially normal to said cutting plane between forward and rearward positions; means on the carriage to releasably secure a length of stock thereto so that said length of stock may be advanced by the carriage and have its front end portion projected through and beyond the cutting plane and then held while the saw cuts off the projecting end portion of the stock, said stock securing means being so located on the carriage that in the forward position of the carriage it is closely adjacent to the cutting plane so that the stock is securely held during the cutting operation despite the fast that the length of the stock to the rear of the cutting plane may be relatively short; means to hold the remaining uncut length of stock at its front end so that the stock may be released from securement to the carriage and the carriage retracted without displacing the stock, said holding means being in front of the cutting plane so as not to interfere with advance of the carriage carried stock securing means to its position closely adjacent to the cutting plane; means to effect operative engagement between the front end portion of the remaining uncut length of stock and said holding means; and means to release the hold of said holding means on the front end portion of the stock after the stock has been secured to the carriage.

2. The machine of claim 1 further characterized by the fact that said holding means is in a fixed position in front of the cutting plane; and wherein the means for effecting operative engagement between the front end portion of the remaining uncut length of stock and the holding means comprises means to effect an additional advance of the carriage at the conclusion of the sawing operation and withdrawal of the saw from in front of the uncut length of stock, to thereby place said front end portion of the stock in position to be engaged by said holding means.

3. A machine for cutting a length of stock into shorter pieces of selected length, comprising: a base having a table to support the stock to be cut; a power driven saw mounted on the base and operable to cut through the stock along a defined fixed cutting plane which intersects the plane of the table top; a first stock gripping means to the rear of said cutting plane; means mounting said first stock gripping means for reciprocation toward and from the fixed cutting plane; a second stock gripping means in front of said cutting plane; power means to cause the first stock gripping means to grip the stock; power means to advance the first stock gripping means into close proximity to the cutting plane so as to place the portion of the stock directly in front of the first stock gripping means in position to be cut and to hold the stock during the cutting operation; power means to cause the second stock gripping means to grip the front end portion of the stock which protrudes from the first stock gripping means; and control means for said several power means operable in consequence of completion of the cutting operation to effect (1) gripping of the protruding front end portion of the stock by said second stock gripping means, (2) release of the grip of the first stock gripping means upon the stock, (3) retraction of the first stock gripping means to a predetermined greater distance to the rear of the cutting zone, (4) release of the grip upon the front end portion of the stock by the second stock gripping means, and (5) such reciprocatory motion of the first stock gripping means as is needed to position the stock for the next cut.

4. A machine for cutting a length of stock into shorter pieces of selected length, which comprises a base having a table to support the stock to be cut, a power driven saw mounted on the base and operable to cut through the stock along a defined fixed cutting plane which intersects the plane of the table top, a first stock gripping vise at one side of the cutting plane mounted for reciprocatory movement toward and from the cutting plane and operable to hold the stock while it is being cut, a second stock gripping vise at the other side of the cutting plane, said machine being characterized by: power means to reciprocate the first vise, whereby stock gripped thereby may be advanced and retracted; manually operable means to adjust the stroke of the first vise; power means to close the vises; and automatic control means for said several power means including a triggering means actuated in response to completion of a sawing operation to effect (1) advance of the first vise a predetermined fixed distance so as to bring the front end portion of the stock which protrudes from the first vise into the range of the second vise, (2) closure of the second vise onto said protruding front end portion of the stock, (3) release of the grip which the first vise had on the stock, (4) retraction of the first vise a distance determined by the setting of said manually operable stroke adjusting means, (5) closure of the first vise to grip the stock, (6) release of the grip which the second vise had on the protruding front end portion of the stock, and (7) such reciprocatory motion of the first vise as needed to bring the stock into position for the next cut.

5. In a machine tool: a work-carrying carriage mounted for advancing and retracting motion between defined limits; a reversible fluid pressure responsive motor connected with the carriage to advance and retract the same and to also hold the carriage at a location short of its limit of advance, said motor having two ports; a control for said motor including a valve for selectively connecting the motor ports with a source of fluid pressure and a return tank, said valve including a spool shiftable endwise in opposite directions from a neutral position maintaining uniform pressure at the two motor ports to thus lock the motor and hold the carriage against movement, shifting of the spool in one direction from its neutral position to a first operating position connecting the motor ports with the pressure source and the tank to effect advance of the carriage and shifting of the spool in the opposite direction to a second operating position connecting the motor ports with the pressure source and tank to effect retraction of the carriage; an abutment movable with the carriage; a pair of spaced apart movable stops in the path of the abutment at opposite sides thereof so that one stop is engaged by the abutment during advance of the carriage and the other during retraction of the carriage; means forming a motion transmitting connection between the stops and the spool whereby response of either stop to engagement therewith by the abutment shifts the spool toward its neutral position; said one stop being shiftable with respect to the spool back and forth from one to the other of two defined locations along the path of travel of the abutment, in either of which said motion transmitting connection is effective to transmit abutment produced motion of said one stop to the spool, so that in either one of said two locations the response of said one stop to engagement therewith by the abutment shifts the spool from its first operating position toward its neutral position, in one of said locations of said one stop response thereof to the movement of the abutment causing the carriage to stop short of its limit of advance, and in the other of said locations said response of said one stop causing the carriage to stop at its limit of advance; and means for shifting said one stop from one to the other of said two locations and holding the same at the location to which it has been shifted so that in either of said locations the motion transmitting connection is operative to impart abutment produced motion of said one stop to the spool.

6. In a machine tool, the structure set forth in claim 5, wherein said stop shifting means is fluid pressure responsive, and wherein the actuation of said fluid pressure responsive means is controlled by a function of the machine.

7. In a machine tool, the structure set forth in claim 5, wherein said stop shifting means comprises: piston and cylinder means comprising a piston member slidable between defined limits in a cylinder member; means positively connecting one of said members with the spool; means positively connecting the other of said members with said one stop which is engaged by the abutment during advance of the carriage, the permitted relative endwise travel of the piston member with respect to the cylinder member defining the two locations of said one stop relative to the spool; and fluid pressure means under the control of a function of the machine to shift the piston member from one to the other of its two limits of movement and to hold the same at said location.

8. In a machine tool, the structure set forth in claim 7, wherein the means connecting said one stop with its respective member of the piston cylinder means comprises a rod movable endwise parallel to the travel of the abutment; and wherein said other stop is mounted on said rod for adjustment lengthwise thereof to thereby determine the point at which retraction of the carriage is stopped.

9. A machine for cutting lengths of stock into shorter pieces of selected length, which comprises a base having a work supporting table, a saw head carrying a power driven saw and mounted for movement with respect to the base to carry the saw up and down in a fixed cutting plane transverse to the work supporting table, whereby stock on the table may be advanced into position to be cut and then cut as the saw head descends, said machine being characterized by: a first stock gripping vise at one side of the cutting plane mounted for reciprocatory motion towards and from a position close to the cutting plane in which position said vise holds the stock while it is being cut; a second stock gripping vise at the other side of the cutting plane; a reversible fluid pressure responsive motor to reciprocate the first vise; means including a manually adjustable stop to govern the length of the retraction stroke of the first vise and thereby determine the length of the pieces into which the length of stock will be cut; fluid pressure responsive motors to close the vises; and automatic control means for said several fluid pressure responsive motors including a triggering means actuated by elevation of the saw head upon completion of a sawing operation to effect the following sequence of operation—(1) advance of the first vise a predetermined fixed distance to thereby project the front end portion of the stock which protrudes from the first vise into the second vise; (2) closure of the second vise onto the protruding front end portion of the stock, (3) release of the grip which the first vise had upon the stock, (4) retraction of the first vise the distance for which the manually adjustable stop is set, (5) closure of the first vise, (6) release of the grip which the second vise had on the protruding front end portion of the stock, and (7) movement of the first vise as needed to bring the stock into position for the next cut.

10. A cutoff saw for cutting a length of stock into shorter pieces of selected length comprising: a base having a table to support the stock to be cut; a power driven saw mounted on the base and operable to cut through the stock along a defined fixed cutting plane which intersects the plane of the table top; a first stock gripping vise to the rear of said cutting plane; means mounting said first vise for reciprocation toward and from a position close to the fixed cutting plane in which position it holds the stock while it is being cut; a second stock gripping vise in front of said cutting plane; means mounting the second vise in a fixed position in front of the cutting plane; power means to close the first vise and thereby grip the stock; power means to advance and/or retract the first vise whereby the stock may be brought into position to be cut, held by the first vise during the cutting operation, and then advanced to project the front end portion of the stock which protrudes from the front vise, into the second vise; power means to close the second vise and cause it to grip the protruding front end portion of the stock; and control means for said several power means including sequence determining instrumentalities and triggering means actuated in response to completion of the sawing operation to effect (1) advance of the first vise to project the protruding front end portion of the stock into the second vise, (2) closure of the second vise, (3) release of the grip which the first vise had on the stock, (4) retraction of the first vise, (5) closure of the first vise to grip the stock, (6) release of the grip which the second vise had upon the protruding front end portion of the stock, and (7) such motion of the first vise as needed to bring the stock into position for the next cut.

11. The cutoff saw of claim 10, wherein the power means for advancing and/or retracting the first vise comprises a reversible fluid pressure responsive motor and lines to connect the same with a source of fluid pressure and a tank return; and wherein the control means includes valves in said lines and means to effect closure of said valves the instant the stock is properly positioned for the next cut, to thereby disconnect the motor from the fluid pressure source and the tank return and lock the motor in its position holding the first vise and the stock gripped thereby against movement in either direction throughout the cutting operation.

12. In a machine tool having a tool operating in a defined work zone and a carriage to present work to said zone to be acted upon by the tool, the combination of: means mounting the carriage for advance toward and retraction from the work zone; means on the carriage to releasably grip a piece of work placed on the carriage; cylinder and piston means to advance and/or retract the carriage and to hold the carriage in a predetermined location between its limits of advance and retraction, and in which location the work on the carriage is in position to be acted upon by the tool; and control instrumentalities for said cylinder and piston means and for the work-gripping means comprising valve means connected between the opposite ends of the cylinder and a source of fluid pressure, means actuated by the travel of the carriage as it arrives at said location and connected with said valve means to cause the same to disconnect both ends of the cylinder from said source of fluid pressure so that the cylinder and piston means holds the carriage in its said location while the tool performs an operation on the work, means actuated in consequence of completion of the operation performed upon the work by the tool and operable to actuate said valve means to cause the same to so connect the cylinder with the source of fluid pressure as to effect advance of the carriage and projection of the work through and beyond the work zone to thus allow the work to be gripped from in front of the work zone, means actuated by said advance of the carriage a predetermined distance and operable upon said valve means to cause the same to reverse the connection of the cylinder with the source of fluid pressure and thereby effect retraction of the carriage, means actuated in timed relation with the reversal of the connection of the cylinder with the fluid pressure source to cause the gripping means on the carriage to release the work before the carriage begins its retraction stroke, means actuated in consequence of said retraction of the carriage a predetermined distance and connected with the valve means to cause the same to again reverse the connection of the cylinder with its source of fluid pressure and effect advance of the carriage toward its aforesaid location, and means actuated in timed relation with said last-named reversal of the connection between the cylinder and the source of fluid pressure to reactivate the work gripping means before the carriage begins its advance.

13. In a machine tool having a work carrying carriage mounted for advancing and retracting motion between limits along a defined path, the combination of: power means to advance and/or retract the carriage and to hold the carriage at a location short of its limit of advance; control means for said power means comprising a selector device having a control element which is movable to render said control means operative to cause the power means to either advance the carriage, retract it or hold it at said location short of its limit of advance; an elongated member mounted for lengthwise movement parallel to the path of movement of the carriage; means providing a lost motion driving connection between the carriage and said elongated member operable to shift the latter endwise in one direction in consequence of advance of the carriage, and in the other direction in consequence of retraction of the carriage, comprising an abutment movable with the carriage, a first stop fixed to said elongated member and positioned to be engaged by the abutment during advance of the carriage, and a second stop mounted on the elongated member for adjustment lengthwise thereof and positioned to be engaged by the abutment during retraction of the carriage, the position of said second stop on the elongated member determining the length of the retraction stroke of the carriage; a two-position coupling connecting the control element with the elongated member for the transmission of motion from the latter to the former with the elongated member in either of two endwise spaced positions relative to said control element, in one of which the first stop is contacted by the abutment to effect stopping of the carriage when the carriage reaches said location short of its limit of advance and in the other of which said first stop is not contacted by the abutment until the carriage reaches the limit of its advance, so that by shifting the elongated member from said first to said second position relative to said control element after the carriage has stopped at said location short of its limit of advance, the carriage may be advanced to its limit of advance; and means to shift the elongated member relative to the control element from either of said positions to the other and for holding the same in the position to which it has been shifted.

14. In a machine tool, the structure of claim 13 wherein the two position coupling comprises a cylinder element and a piston element slidable therein between defined limits, one of said elements being connected to the control element and the other being connected to the elongated member; and wherein the means for shifting the elongated member relative to the control element comprises means to selectively connect one or the other of the opposite ends of the cylinder element with a source of fluid pressure.

15. In a machine tool having a tool operating in a defined work zone and a carriage to present work to said zone to be acted upon by the tool, the combination of: means mounting the carriage for advance toward and retraction from the work zone; means on the carriage to releasably grip a piece of work placed on the carriage; a reversible fluid pressure responsive motor to advance and/or retract the carriage and to hold the carriage in a predetermined working location short of its limit of forward travel, in which location the work gripping means on the carriage is close to the work zone and the work is in position to be acted upon by the tool; a control for said motor including (1) valve means for connecting the motor with a fluid pressure source and a return, said valve means having a spool shiftable endwise from a neutral position maintaining balanced pressure in the motor and holding the carriage against movement in either direction, to a first operating position in which it connects the motor with the pressure source and the return to effect advance of the carriage, and to a second operating position in which it connects the motor with the pressure source and the return to effect retraction of the carriage, and (2) spool shifting means connected between the carriage and the spool and through which motion of the carriage always acts to shift the spool toward its neutral position, said spool shifting means comprising an abutment movable with the carriage, an elongated endwise movable member parallel to the path along which the carriage moves, spaced first and second stops on said elongated member positioned to be engaged by the abutment, the first during advance and the second during retraction of the carriage, a two position coupling connecting the spool with said elongated member for the transmission of motion from the latter to the former with the elongated member in either of two endwise spaced locations relative to the spool, in one of which the first stop is in position to be contacted by the abutment to effect stopping of the carriage when the carriage reaches its working location, and in the other of which said first stop is not contacted by the abutment until the carriage reaches its limit of forward travel, so that by shifting the elongated member from said first to said second location relative to the spool after the carriage has been stopped at working location, advance of the carriage to its limit of forward travel may be resumed providing the tool has been moved out of the way.

16. In a machine tool, the structure of claim 15, further characterized by the fact that said first stop is fixed to the elongated member, and the second stop is adjustable lengthwise of the elongated member to enable the length of the retraction stroke of the carriage to be adjusted.

17. In a cutoff saw: a base having a table; a saw head mounted upon the base for up and down movement and carrying a power driven saw constrained to travel in a fixed vertical cutting plane as the saw head descends to cause the saw to cut through a length of stock on the table; a first vise behind the cutting plane; a carriage mounting said first vise for horizontal translation toward and from a position close to the cutting plane so that a length of stock gripped thereby may have its front end portion projecting through and beyond the cutting plane and held while the saw cuts off its projecting front end portion; a second vise in front of the cutting plane to grip the portion of the remaining length of stock protruding from the first vise, after the cutting operation and upon further advance of said remaining length of stock by the carriage to hold the stock after the grip of the first vise is released and while the carriage is retracted to enable the first vise to take a new grip upon the stock; each of said vises having complementary relatively adjustable upright jaws at least one of which in each instance is mounted only at its top so that upon closure of the vises the inherent spring of their top-mounted jaws produces a downward divergence of the vise jaws which imparts downward thrust upon the stock to hold the same firmly down on the table.

References Cited by the Examiner

UNITED STATES PATENTS

| | | | |
|---|---|---|---|
| 590,820 | 9/97 | Breul | 269—134 |
| 1,965,341 | 7/34 | Houston | 83—39 |
| 2,033,946 | 3/36 | Lippincott | 83—201 |
| 2,247,656 | 7/41 | Friedrick | 269—134 |
| 2,708,968 | 5/55 | Soave | 83—39 |
| 2,883,736 | 4/59 | Crane | 83—201 |
| 2,932,229 | 4/60 | Crane | 83—201 |

ANDREW R. JUHASZ, *Primary Examiner.*

CARL W. TOMLIN, HUNTER C. BOURNE, JR.,
*Examiners.*